United States Patent [19]

Suzuki et al.

[11] Patent Number: 5,475,507
[45] Date of Patent: Dec. 12, 1995

[54] COLOR IMAGE PROCESSING METHOD AND APPARATUS FOR SAME, WHICH AUTOMATICALLY DETECTS A CONTOUR OF AN OBJECT IN AN IMAGE

[75] Inventors: Shoji Suzuki; Masanaga Tokuyo, both of Kawasaki, Japan

[73] Assignee: Fujitsu Limited, Kawasaki, Japan

[21] Appl. No.: 134,826

[22] Filed: Oct. 12, 1993

[30] Foreign Application Priority Data

| Oct. 14, 1992 | [JP] | Japan | 4-275593 |
| Oct. 14, 1992 | [JP] | Japan | 4-281205 |
| Aug. 13, 1993 | [JP] | Japan | 5-201406 |

[51] Int. Cl.$^6$ .................................................. G01N 21/88
[52] U.S. Cl. ............................................................. 358/500
[58] Field of Search ...................................... 358/500, 517, 358/532; 382/22, 10, 9, 17, 48, 54; 364/448, 521; 395/128, 131

[56] References Cited

U.S. PATENT DOCUMENTS 4,876,457  10/1989  Bose .......................... 250/562

*Primary Examiner*—Stephen Brinich
*Attorney, Agent, or Firm*—Staas & Halsey

[57] ABSTRACT

A point at a position near the contour of a desired object in an image being processed is designated, and a boundary point on the contour of the object is detected on the basis of the designation. From the detected boundary point, other points on the object-contour are subsequently detected to detect the object-contour. When the object-contour has been detected, either the inside or the outside of the object-contour is uniformly filled with prescribed image data, so as to extract the object from the image. Extracted image data resulting from the extraction is output. The extracted image data may include mask data indicating the color mixing ratio at a boundary portion between the object and the background thereof so that color adjustment or image composition can be performed using the mask data.

30 Claims, 37 Drawing Sheets

F I G. 4 3 A
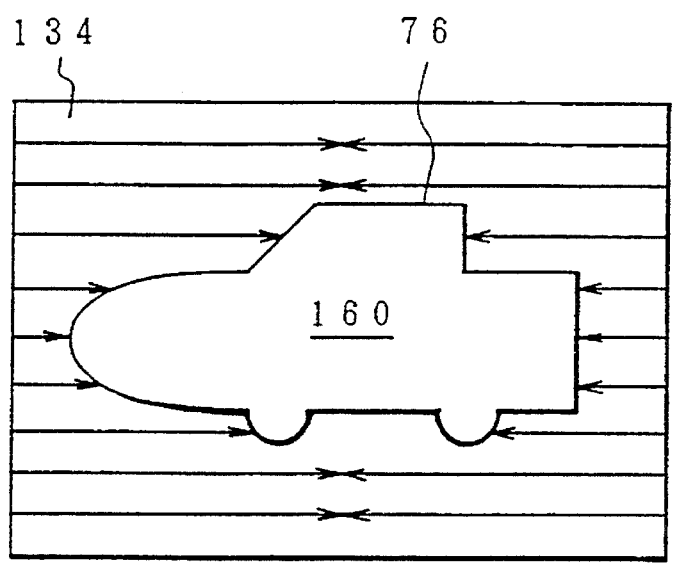
F I G. 4 3 B
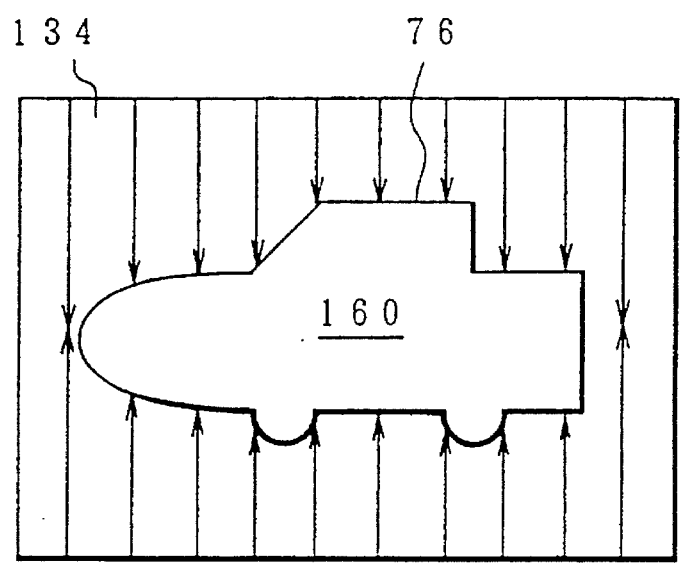

COLOR IMAGE PROCESSING METHOD AND APPARATUS FOR SAME, WHICH AUTOMATICALLY DETECTS A CONTOUR OF AN OBJECT IN AN IMAGE

BACKGROUND OF THE INVENTION

1. Field of the Invention

The present invention relates to a color image processing method and an apparatus for carrying out such a method that is capable of extracting a desired object from an input color image on the basis of a detected contour of the object, so as to perform color adjustment or image composition. Particularly, the present invention relates to such a color image processing method and an apparatus for the same that is capable of automatically extracting a desired object while requiring a simple operation from the operator.

Image processing technology is used in a wide variety of fields including design systems employing computers, computer graphics, desk-top publishing capable of producing illustrated documents, and systems for producing printing originals. In image processing technology, an object in an image may be subjected to various processings such as a processing for changing the color of the object (color-changing), a processing for changing the size or the shape of the object (enlargement, reduction, or transfiguration), a processing for composing the object with another image (composition), and a processing for recognizing that portion of the image representing the particular object which may be, for example, a human figure, a vehicle or a desk (recognition). For instance, in a system for designing goods such as packages or vehicles, or a system for designing posters or the like, computer-graphic images are produced by employing a computer, or an original image, in particular, a color original image, is input through a reader, and then subject to processings such as those for changing the size, shape and/or color of the image or those for changing a background portion of the image.

In processing a color image with a computer, it is required that processings, such as color-changing, enlargement, reduction, transfiguration, composition and recognition, can be easily performed with high precision; it is also required to have an interface between the operator and the computer (i.e., a human interface) which can be easily used. In the case where an object in an image is subjected to a processing such as color-changing, enlargement, reduction, transfiguration, composition or recognition, the object to be processed must first be extracted from the original image by detecting the contour of the object and extracting both the contour of the object and the object proper enclosed by the contour. Since such object-contour detection and object extraction are essential to the subsequent image processing, they are required to be able to be easily performed with high precision.

The level of ease with which object-contour detection and object extraction can be performed is important in order to increase the work efficiency of the entire image processing. The level of precision of object-contour detection and object extraction is also important because this determines the quality of an image that can be finally obtained (i.e., the degree in which the results of color-changing or composition are natural). Therefore, it is desired that object-contour detection and object extraction be effected by a method which enables higher levels of ease and precision.

2. Description of the Related Art

Regarding object-contour detection, a conventional method for contour detection generally employs a differentiation process or a threshold provided for differences in density or brightness at a boundary. That is, a contour of an object is detected by subjecting the entire image to a batch differentiation process, or by providing an appropriate threshold set by the operator in such a manner that only the contour of the object can be aptly detected.

Regarding object extraction, almost all the operations for object extraction have been manually performed by the operator. That is, when an image is displayed on a display, the operator checks each boundary portion of the image, and uses a mouse or a light-pen to give specification as to whether each pixel in a boundary portion is to be extracted or not. A conventional object extraction method is, to some extent, adapted for automatic extraction of an object. In this method, certain properties of the object to be extracted, such as the color of the object, the pattern on the surface of the object, or changes thereof, are utilized so that only those portions having similar properties, such as similar colors or similar spatial frequencies, are extracted as the object.

However, a conventional contour detection method employing a differentiation process has the following disadvantage: since the entire image is subjected to a batch process, the results of detection may include the contour of an object other than the pertinent object to be extracted, or an unwanted boundary, such as an edge, within the object. A conventional contour detection method employing a threshold is disadvantageous in that, in general, the entire contour of an object cannot be properly detected with a single threshold, and it is necessary to provide a threshold appropriate for each boundary position at which detection is wanted, thereby resulting in poor work efficiency. In addition, both a method employing a differentiation process and a method employing a threshold require a substantial amount of aid from the operator in order that a contour line of the target object can be finally obtained as a continuous closed line. As a result, work efficiently is poor, and the precision of detection cannot be greatly improved.

Conventional object extraction which relies on manual operations by the operator has a disadvantage in that the work requires much time and labor. For example, it takes several hours for an operator to successfully extract an object, such as a vehicle, in an image displayed on a screen even when the operator is experienced at least to some extent. The need for such a long period of time results particularly from pixels in the boundary portion of the object. With regard to these pixels, it is necessary to judge whether each of the pixels is to be included in the object or the background. For this purpose, the image must be enlarged, and judgement must be made for each point (each pixel).

A conventional object extraction method utilizing a particular property of the object, such as the color or spatial frequency thereof, is not capable of accurately extracting the object alone, and accordingly, has a low level of extraction precision. For example, when extracting an object by utilizing the color of the object, which is a property thereof, there is the requisite that the color of the object be absent from the background. If the background contains any image portion of the same color as the object, the image portion in the background is extracted together with the object, providing poor precision of extraction. In addition, even when an object is entirely of a particular color, the object may have portions varying in tone, such as a relatively dark portion representing a shadow, or a relatively light portion representing luster, and it is difficult to extract the object including these portions as a whole.

When object extraction has such poor precision as to result in an image portion that should belong to the background being extracted, or an image portion that should belong to the object remaining unextracted, the subsequent image processing, such as color-changing, composition, enlargement, reduction, or transfiguration, provides an image of poor quality, such as an image including an unnecessarily color-changed portion in the background.

SUMMARY OF THE INVENTION

An object of the present invention is to provide a color image processing method and an apparatus for the same that is capable of automatically detecting the contour of an object in an image when simple designation is given by the operator.

In a color image processing method according to the present invention, the contour of a desired object in a color image is detected by the following steps: a contour position designation step wherein a position in a color image near the contour of a desired object contained in the image is designated; a boundary point detection step wherein a boundary point on the contour of the object is detected on the basis of designation in the contour position designation step; an object-contour tracking step wherein the contour of the object is detected by subsequently detecting other points on the contour from the boundary point which has been detected in the boundary point detection step; and a termination step wherein contour detection in the object-contour tracking step is checked, and the contour detection is terminated when the contour detection satisfies a prescribed condition.

According to the present invention, a desired object in a color image is extracted therefrom by the following steps: a detection step wherein the contour of a desired object in a color image is detected; an extraction step wherein a portion of the image which is either inside or outside of the contour is uniformly filled with prescribed image data so as to extract the object from the image; and an outputting step wherein extracted image data obtained by the extraction step is output.

In the present invention, the contour of a desired object may be detected as a contour area having certain width. Object extraction according to the present invention may provide mask data indicating the ratio of color mixing in a boundary portion between the object and the background thereof, so that the mask data can be used in color adjustment or image composition to calculate mixed colors in a new boundary portion.

With a color image processing method and an apparatus for same having the above-described arrangement, it is possible to automatically detect the contour of a desired object in a color image through simple designation by the operator and computer operations based on the designation. Then, the object can be extracted by uniformly applying prescribed image data to, for example, the inside of the detected contour. In this way, highly precise object-contour detection and object extraction are possible with reduced burden on the operator. Accordingly, the work efficiency of the entire image processing can be greatly improved. Further, processing such as color-changing, enlargement, reduction or composition can be performed with high precision, enabling the achievement of high image quality.

The above and other objects, features, and advantages of the present invention will become more apparent from the following detailed description with reference to the drawings.

BRIEF DESCRIPTION OF THE DRAWINGS

FIGS. 43A and 43B are views for explaining a manner of filling the outside of an object-contour for object extraction;

DETAILED DESCRIPTION OF THE PREFERRED EMBODIMENTS

Figure 1:
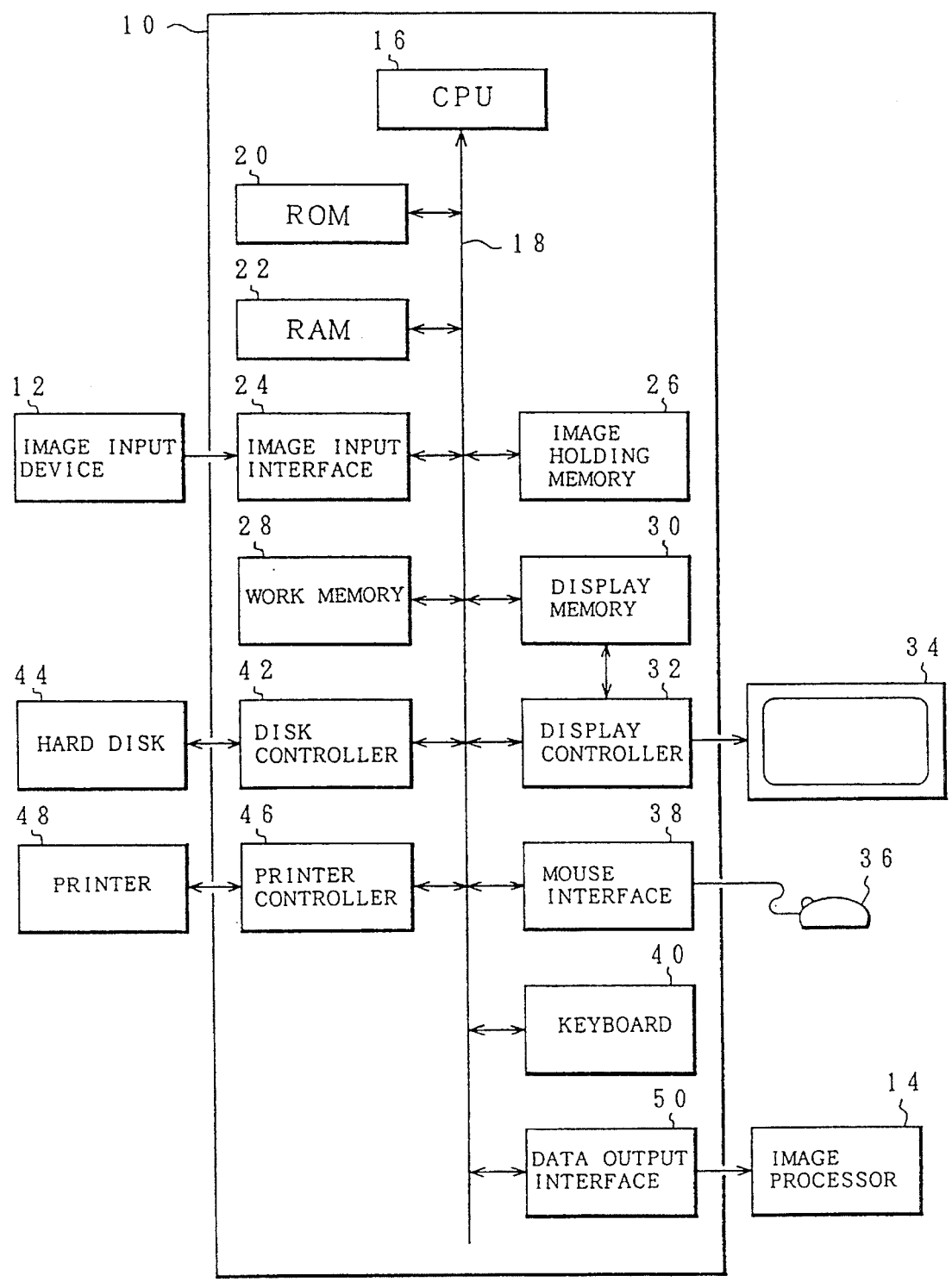
FIG. 1 is a block diagram showing a hardware configuration according to the present invention.

1. Construction of Apparatus for Carrying out Image Processing and Object Extraction FIG. 1 shows an embodiment of an image processing apparatus for carrying out image processing and object extraction according to the present invention. The apparatus has an image processing computer 10 which includes a CPU 16 as a controlling means. An internal bus 18 extends from the CPU 16. A ROM 20 is connected with the internal bus 18, and permanently stores control programs for performing image processing and object extraction according to the present invention. A RAM 22 is used as a controlled storage of the CPU 16, and is provided to temporarily store data necessary to the detection of the contour of an object or the extraction of an object. An image input interface 24 is provided to connect the computer 10 with an external image input device 12 so that image data can be input to the computer 10. The image input device 12 comprises an image scanner or the like, which reads image information from a photograph, a print, etc., and from which image data is input as a color signal such as a RGB or UV signal. Image data input through the image input interface 24 is stored in an image holding memory 26. A work memory 28 is provided to develop a desired portion of the image data input in the image holding memory 26, so as to perform object-contour detection or object extraction. A display memory 30 stores image data which is to be displayed through a display controller 32 onto a color display 34. A disk controller 42 is connected with a hard disk 44 serving as an external storage. A printer controller 46 is connected with an external printer 48 for controlling the printer 48. A mouse 36 is connected with a mouse interface 38, so that, when an input image is displayed on the color display 34, each designation for object-contour detection or object extraction can be input by setting a cursor on the displayed image. A type of designation device other than a mouse, such as a light-pen or digitizer, may be used. A keyboard 40 is provided for delivering various inputs to the image processing computer 10. A data output interface 50 is connected with an external image processor 14 so that object extraction data obtained by the image processing computer 10 can be sent to the image processor 14, in which necessary processing(s), such as color-changing, enlargement, reduction, transfiguration, composition and/or recognition are performed after object extraction.

Figure 2:
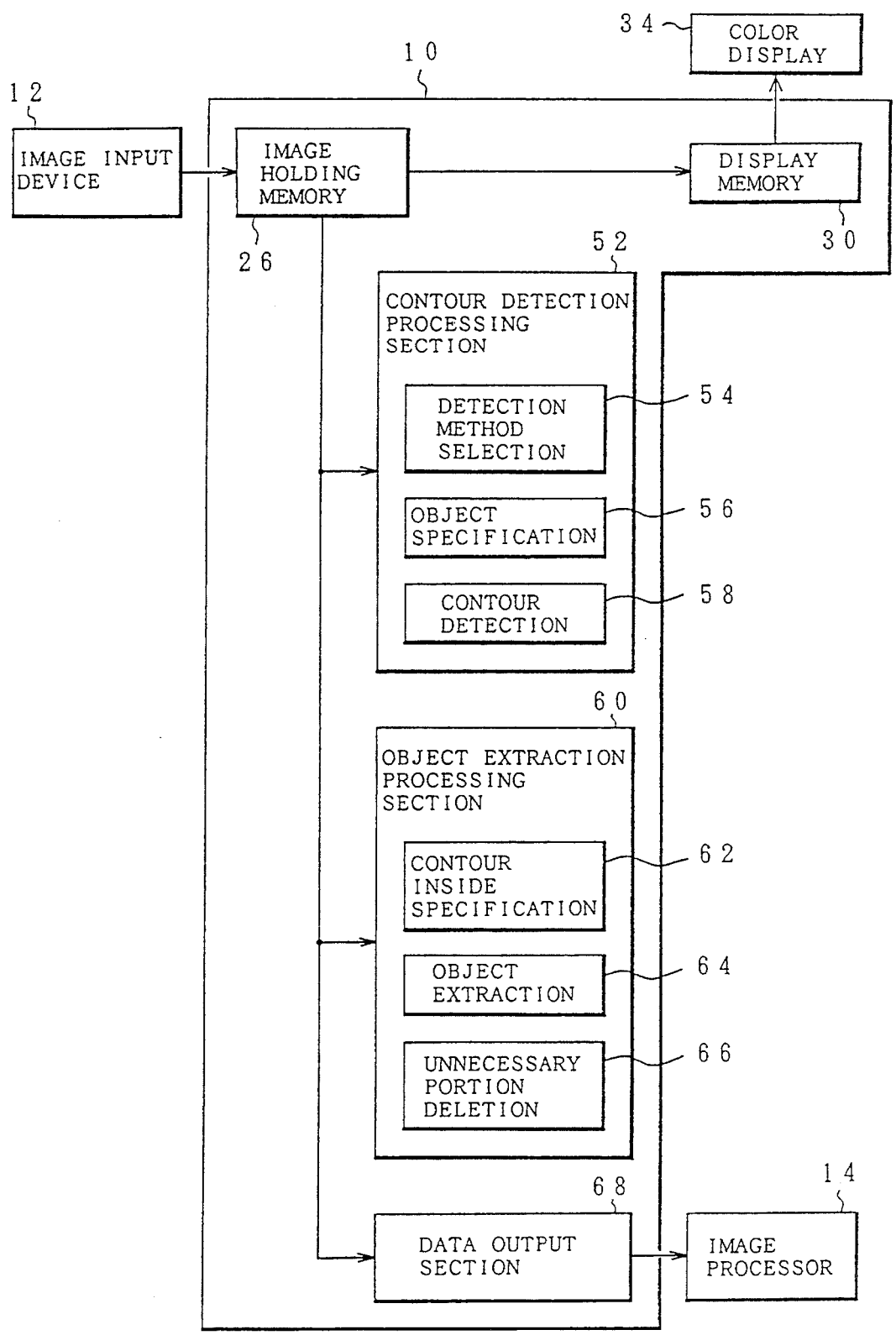
FIG. 2 is a block diagram showing various functions featured according to the present invention.

FIG. 2 shows various functions provided in the image processing computer 10 for performing object-contour detection and object extraction according to the present invention. Two major sections, that is, a contour detection processing section 52 and an object extraction section 60, are provided in the image processing computer 10 to perform the relevant functions under program-control by the CPU 16. The contour detection processing section 52 comprises a detection method selection sub-section 54, an object specification sub-section 56 and a contour detection sub-section 58. The object extraction section 60 comprises a contour inside specification sub-section 62, an object extraction sub-section 64, and an unnecessary portion deletion sub-section 66.

The fundamental processing functions for performing object-contour detection and object extraction will be described with reference to FIG. 2. Image data in the form of a color signal, such as a RGB signal, from the image input device 12, such as an image scanner, is stored in the image holding memory 26. The image data stored in the image holding memory 26 is sent, with no substantial change in the image data, to the display memory 30, and then displayed on the color display (color monitor) 34. When the input image is thus displayed, the operator uses the function of the object specification sub-section 56 of the contour detection processing section 52 to specify a particular object in the image displayed on the color display 34 which is to be subjected to contour detection. When the operator has specified such an object, the contour detection sub-section 58 operates to detect the contour of the specified object. Then, the operator uses the detection method selection sub-section 54 to choose one of a plurality of possible contour detection methods previously provided in the apparatus in accordance with the characteristics of the image being processed. Then, the contour detection sub-section 58 performs contour detection by the chosen method.

When the contour detection sub-section 58 has detected the contour of the object, the object-contour is stored in the display memory 30, and then displayed, as the results of detection, on the color display 34. When the object-contour which has been detected from the input image data is displayed on the color display 34, the operator uses the functions of the object extraction processing section 60. Specifically, the operator uses the contour inside specification sub-section 62 to specify the inside of the object-contour displayed on the color display 34. When the operator's specification has thus been given, the object extraction sub-section 64 performs an extracting operation by uniformly filling either the inside or the outside of the contour with prescribed image data, so that data on coordinates within the contour are obtained as the results of object extraction. The results of object extraction on the basis of the detection of the object-contour are sent to the display memory 30, and are displayed on the color display 34. The object extraction results are also output through the data output section 68 to the image processor 14. When an object-contour detected by the contour detection processing section 52 for object extraction contains an unnecessary portion, the unnecessary portion deletion sub-section 66 is used to perform correction in which the unnecessary portion in the detected object-contour is deleted. Data output to the image processor 14 through the data output section 68 is used in various image processing(s) such as color-changing, image composition, enlargement and/or reduction.

2. Object-Contour Detection

Figure 3:
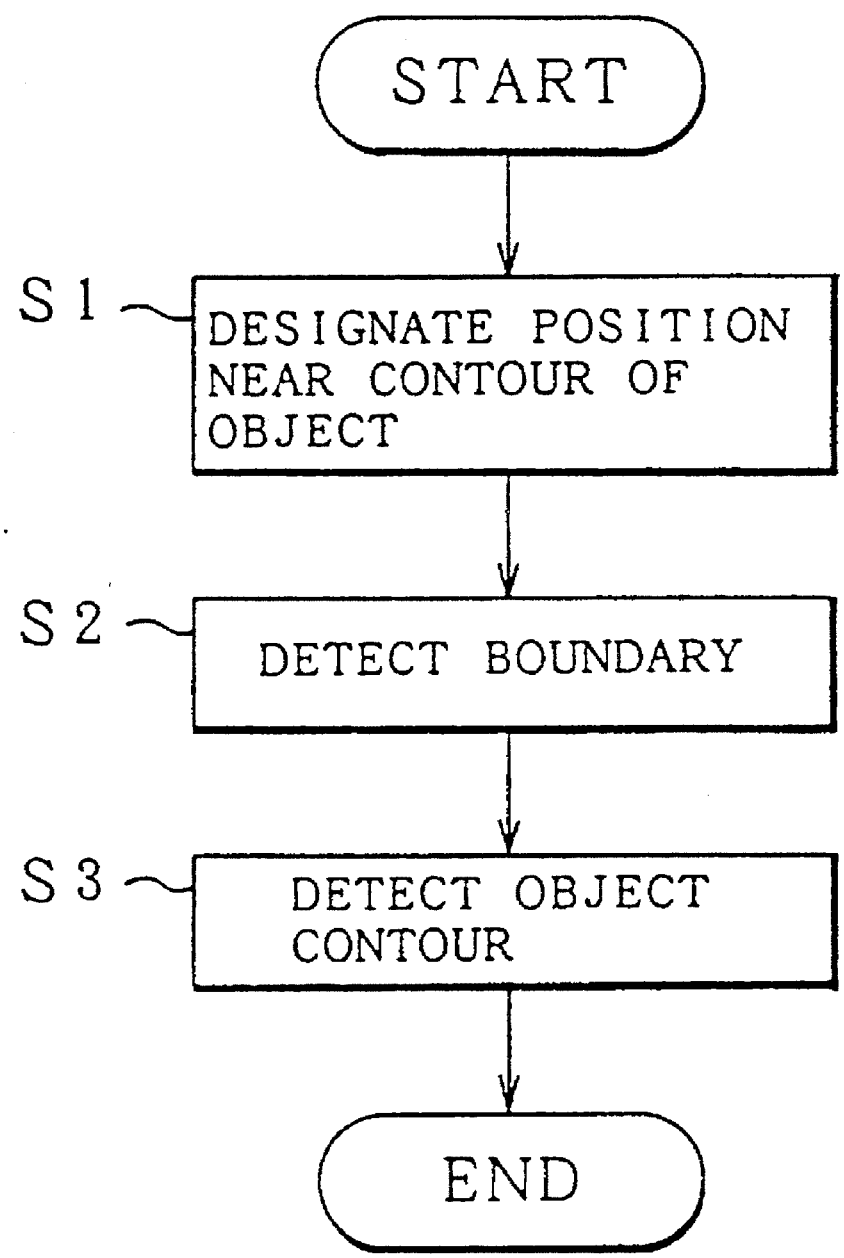
FIG. 3 is a flowchart showing the manner in which an object-contour is detected according to the present invention.

The flowchart provided in FIG. 3 shows basic processes of object-contour detection in an image processing method according to the present invention. In Step S1, when an image is displayed on the color monitor, a position near the contour of a particular object in the image whose contour is to be detected, is designated. This designation is effected as, for example, a designation given by the operator through a mouse or the like, or an automatic designation followed by detection of positions near the object-contour. Such automatic designation may be performed as a part of subsequent detections of the contours of the same type of objects in a plurality of images, such as vehicles. In this case, automatic designation is carried out by utilizing certain knowledge of the objects, such as their shape and their position in the images, to designate each position near the object-contour. Hereinafter, however, descriptions will be given mainly concerning the case where designation is given by the operator. In Step S2 shown in FIG. 3, on the basis of the position designated in Step S1, a boundary point which is near the designated point and which is between the object and the background thereof is detected. In Step S3, on the basis of the boundary point detected in Step S2, all the boundary points on the periphery of the object are detected to detect the object-contour comprising boundary points on the entire periphery of the object.

Figure 4A:
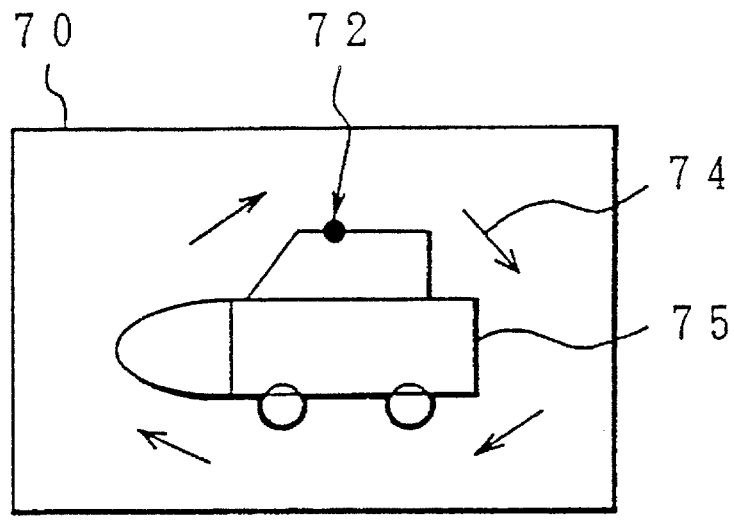
FIGS. 4A and 4B are views for explaining manners in which an object whose contour is to be detected may be designated.
Figure 4B:
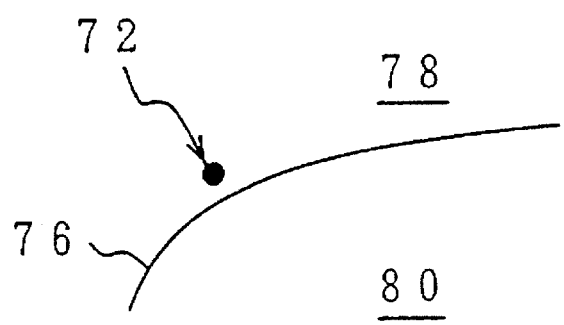

FIGS. 4A and 4B show possible manners of designating a point near the contour of the relevant object in Step S1 (FIG. 3). In FIG. 4A, an object whose contour is to be detected is exemplified by a vehicle 75. In order to detect the contour of the vehicle 75, a point 72 forming a part of the contour of the vehicle 75 is designated. In designation in Step S1 (FIG. 3), strict designation of a point on the contour is not necessary. A rough designation is possible, and, as shown in FIG. 4B, a position near the contour 76 of an object 80 may be designated as a designated point 72 by the operator. A boundary point which is exactly on the object-contour is detected in the following Step S2 (FIG. 3). Although, in the designation manner shown in FIG. 4B, the designated point 72 is in the region of the background 78 on the outside of the contour 76, the designated point 72 may be alternatively in the region of the object 80 on the inside of the contour 76. When the operator designates a point 72 on or near the contour 76 on a monitor screen 70 displaying the relevant image, the operator designates at least one position of the image by using a mouse, a light-pen or a digitizer.

Figure 5:
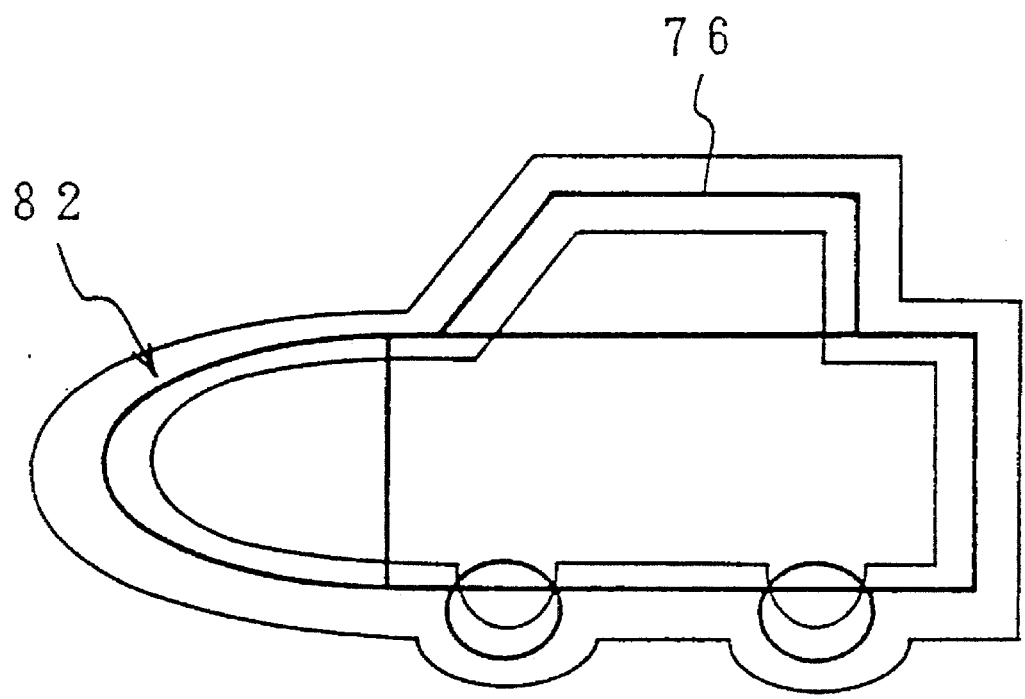
FIG. 5 is a view for explaining another manner of designating an object whose contour is to be detected.

FIG. 5 shows another possible manner of designating a point for object-contour detection. In contrast with the manners shown in FIGS. 4A and 4B in which point(s) are designated, the manner shown in FIG. 5 is characterized in that a region is designated. In FIG. 5, when the image containing the object whose contour is to be detected is displayed on the monitor screen 70, the operator moves a mouse or the like on the object-contour 76, thereby designating a region containing and centered on the object-contour 76, i.e., a designated boundary region 82. On the basis of the designation of the boundary region 82, accurate detection of the object-contour 76 is effected in the boundary detection process of Step S2 (FIG. 3) described later. As shown in FIGS. 4A and 4B and FIG. 5, the operator need not strictly designate the position of the object-contour to be detected; thus, the operational burden on the operator is reduced.

3. First Embodiment of Boundary Point Detection Process

Figure 6:
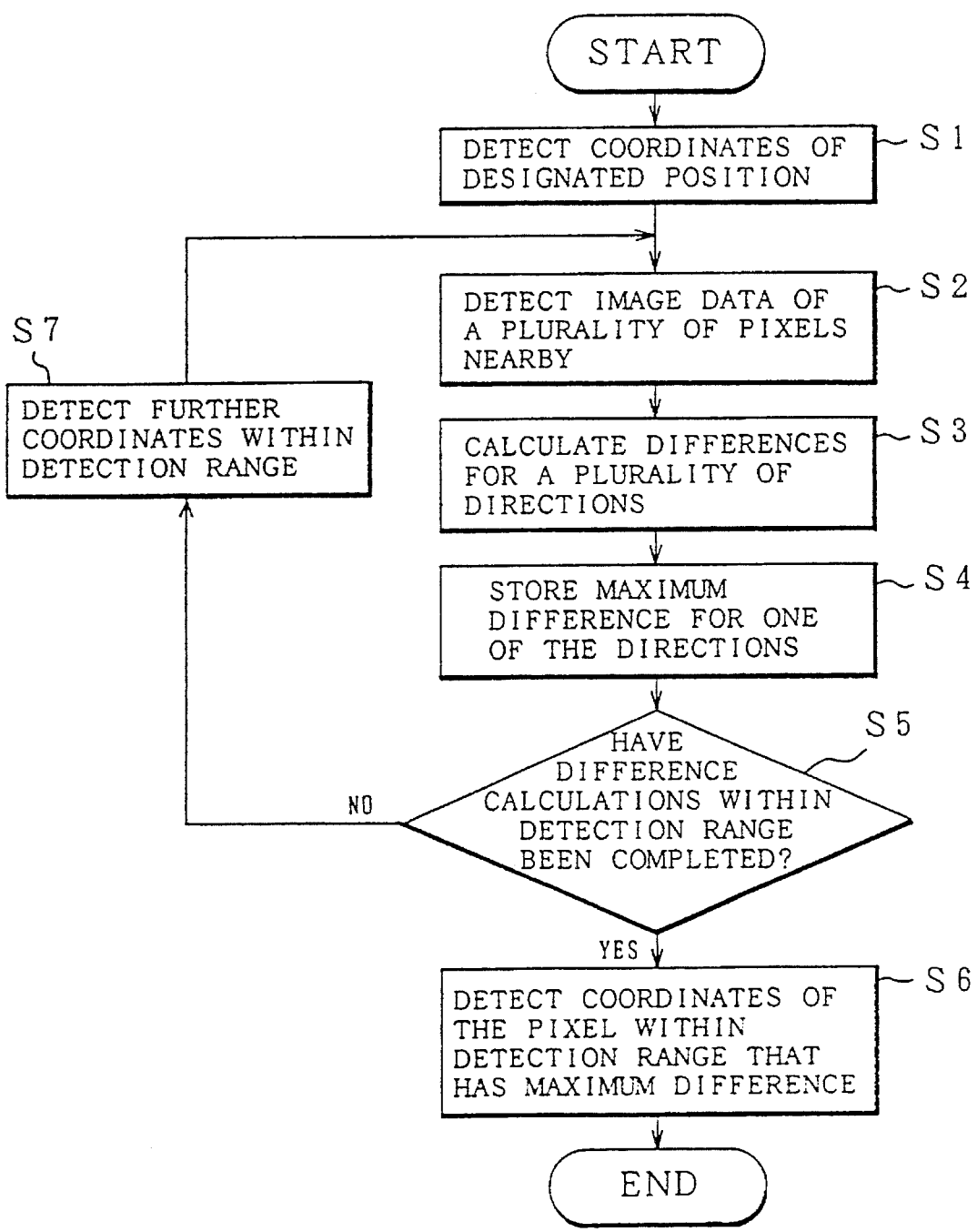
FIG. 6 is a flowchart showing a first embodiment of a boundary detection process of the object-contour detection shown in FIG. 3.
Figure 7:
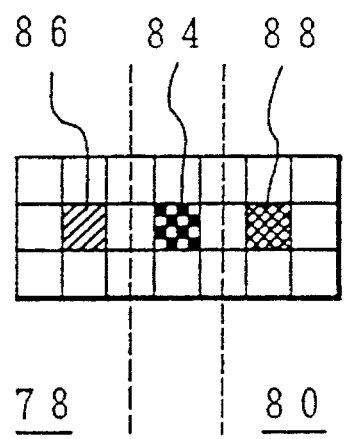
FIG. 7 is a view for explaining the detection of differences between a boundary-detection pixel and left and right pixels, all arranged in a horizontal direction.
Figure 8:
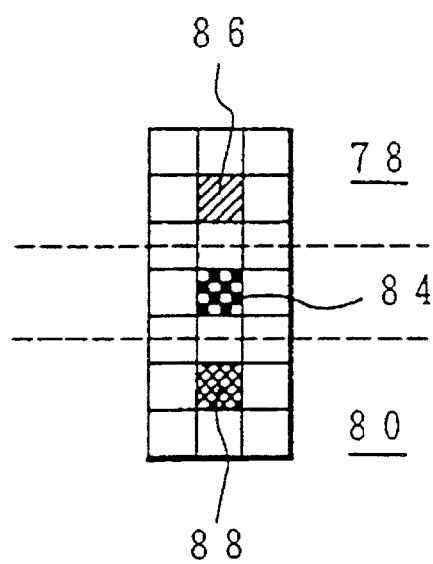
FIG. 8 is a view for explaining the detection of differences between a boundary-detection pixel and upper and lower pixels, all arranged in a vertical direction.
Figure 9:
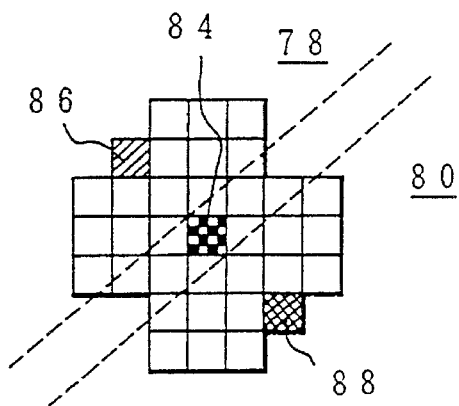
FIG. 9 is a view for explaining the detection of differences between a boundary-detection pixel and two other pixels, all arranged in an oblique direction.

FIG. 6 is a flowchart showing in detail a first embodiment of a boundary detection process which may be effected in Step S2 shown in FIG. 3. Referring to FIG. 6, in Step S1, the coordinates of a position which has been designated by the operator are detected. In Step S2, image data of a plurality of pixels nearby are detected. FIG. 7 shows some of such detection pixels nearby whose image data are detected on the basis of a designated pixel. When a boundary-detection pixel 84 is given as a pixel to be used in the current sampling (the boundary-detection pixel 84 comprising the designated pixel in the first sampling), image data of left and right pixels 86 and 88, respectively, each of which is one pixel distant from the boundary-detection pixel 84 in the main scanning direction (horizontal direction), are detected. As shown in FIG. 8, image data of other detection pixels, that is, upper and lower pixels 86 and 88, respectively, each of which is one pixel distant from the boundary-detection pixel 84 in the sub-scanning direction (vertical direction), are detected. Further, as shown in FIG. 9, image data are also detected concerning detection pixels 86 and 88, each of which is one pixel distant from the boundary-detection pixel 84 in an oblique direction. Although, in each of FIGS. 7, 8 and 9, the detection pixels are distant from the boundary-detection pixel 84 by one pixel, they may be distant therefrom by more than one pixel.

When image data of detection pixels 86 and 88 at positions distant from the boundary-detection pixel 84 by one or more pixels in the horizontal, vertical and oblique directions have been detected, Step S3 (FIG. 6) is executed. In step S3, the difference of image data between the boundary-detection pixel 84 and the each of the detection pixels in one of a plurality of directions is calculated. In Step S4, the maximum of the calculated differences which is present in one of the plurality of directions is stored. When the image data used comprise color data, one of the color components of the RGB system, the YUV system or the like is used to calculate differences for a plurality of directions, and the maximum difference for one of the directions is stored. Alternatively, differences may be calculated with respect to all the color components RGB, YUV or the like for each direction, and the maximum of all the calculated differences may be stored. When a maximum difference is stored after calculating differences of all the color components for each direction, although the amount of calculations needed increases, it is possible to cope with various changes in color and tone, thereby making it possible to increase the level of precision of object-contour detection. Difference calculations for a plurality of directions, as shown in FIGS. 7, 8 and 9 assure that a point on the boundary can be detected regardless of in which direction the boundary actually lies with respect to the boundary-detection pixel 84.

When the maximum difference for one of the plurality of directions has been stored in Step S4 shown in FIG. 6, Step S5 is executed. In Step S5, a determination is made as to whether or not Steps S2 to S4 have been executed at all the pixels within a detection range (a previously set range, as will be described with reference to FIG. 10). If the answer to this question is negative, Step S7 is executed, in which the coordinates of another boundary-detection pixel within the detection range are detected to again execute Step S2 et seq. If it is determined in Step S5 that difference calculations have been completed within the detection range, Step S6 is executed. In Step S6, the coordinates having the maximum of the differences stored in correspondence with the individual boundary-detection pixels within the detection range, are detected as a boundary point.

Figure 10:
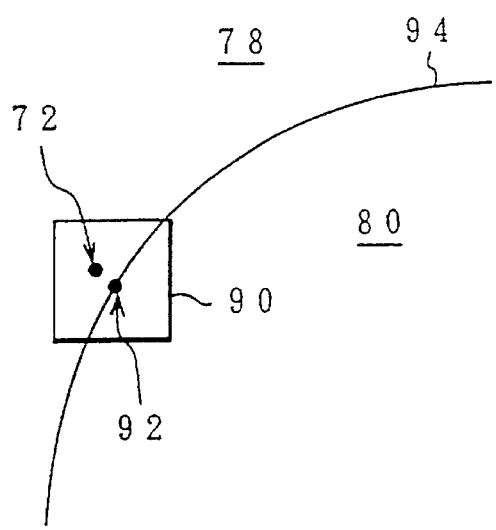
FIG. 10 is a view for explaining detection around a designated point.

FIG. 10 shows the relationship among a point 72 designated by the operator, a detection range, and a boundary point detected. When a point 72 near a boundary 94 between an object 80 and a background 78 has been designated by the operator, a detection range of a certain shape, such as a rectangular detection range 90, is set around the designated point 72. Then, Steps S2 to S4 shown in FIG. 6 are repeatedly executed at all the pixels within the detection range 90, and a boundary point 92 is finally detected.

Figure 11A:
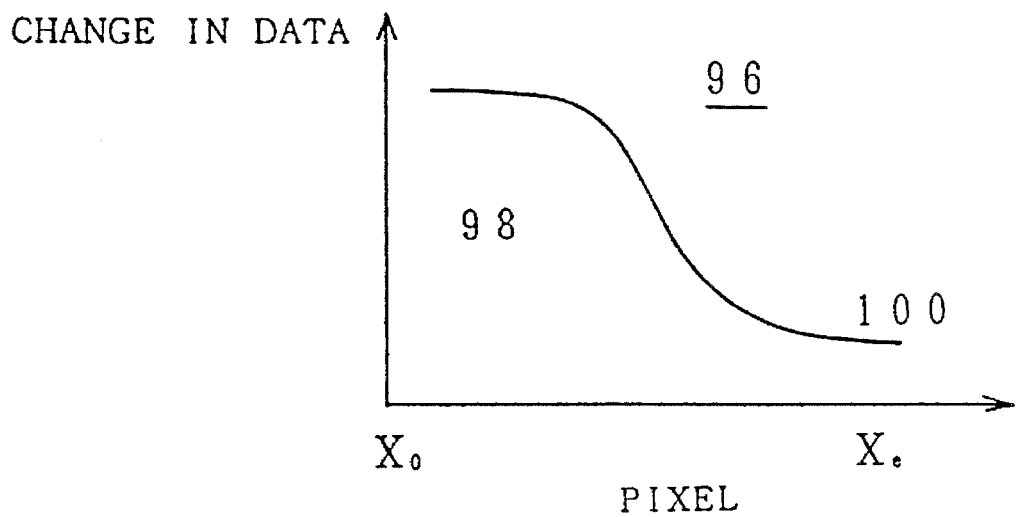
FIGS. 11A and 11B are graphs for explaining boundary determination on the basis of differences between pixels.
Figure 11B:
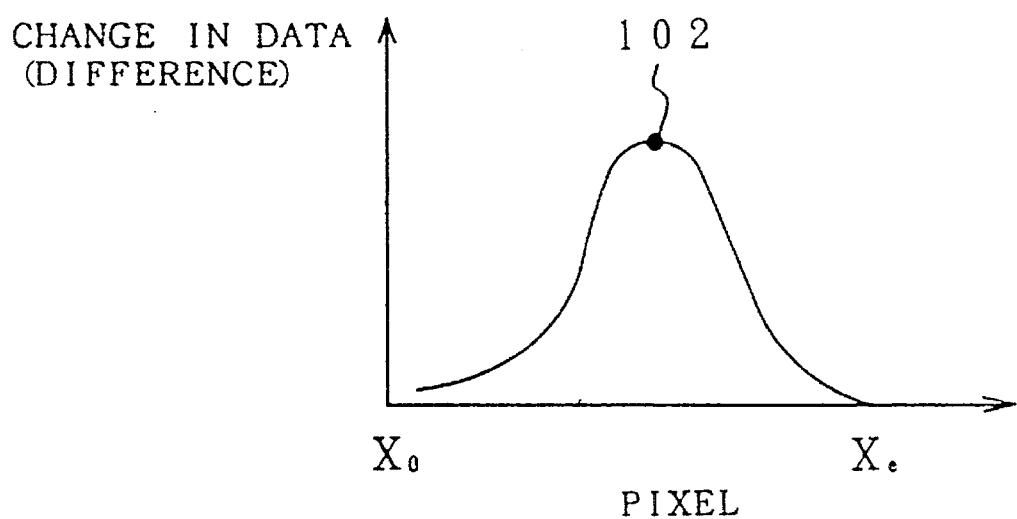

FIGS. 11A and 11B show changes in image data and changes in differences of image data in a boundary region in image data, as well as a manner of making a boundary determination. As shown in FIG. 11A, image data gradually changes in a boundary region 96 from an object color 98 to a background color 100. Such gradual changes in color in a boundary region 96 can be regarded as blurs caused by a lens of the input device, such as a camera or an image scanner, used to input the image. In order to compare image-data differences within a detection range, differences of image data are subsequently calculated at pixels $X_0$ to $X_e$ across the boundary region, and the calculated differences are plotted, as shown in FIG. 11B. When image-data differences are distributed across a boundary region as shown in FIG. 11B, the pixel having the maximum difference within the detection range is determined as a boundary point 102. When the pixels $X_0$ to $X_e$ have the image data shown in FIG. 11A, each of the differences shown in FIG. 11B is calculated by using, as shown in FIGS. 7, 8 and 9, a boundary-detection pixel 84 serving as a sampling pixel and a plurality of detection pixels 86 and 88 each distant from the boundary-detection pixel 84 by at least one pixel. Although pixels adjacent to the boundary-detection pixel 84 may, of course, be used, the use of detection pixels distant from the pixel 84 by one pixel or thereabout makes it possible to reduce the influence of noise and to facilitate detection of color changes.

4. Second Embodiment of Boundary Point Detection Process

Figure 12:
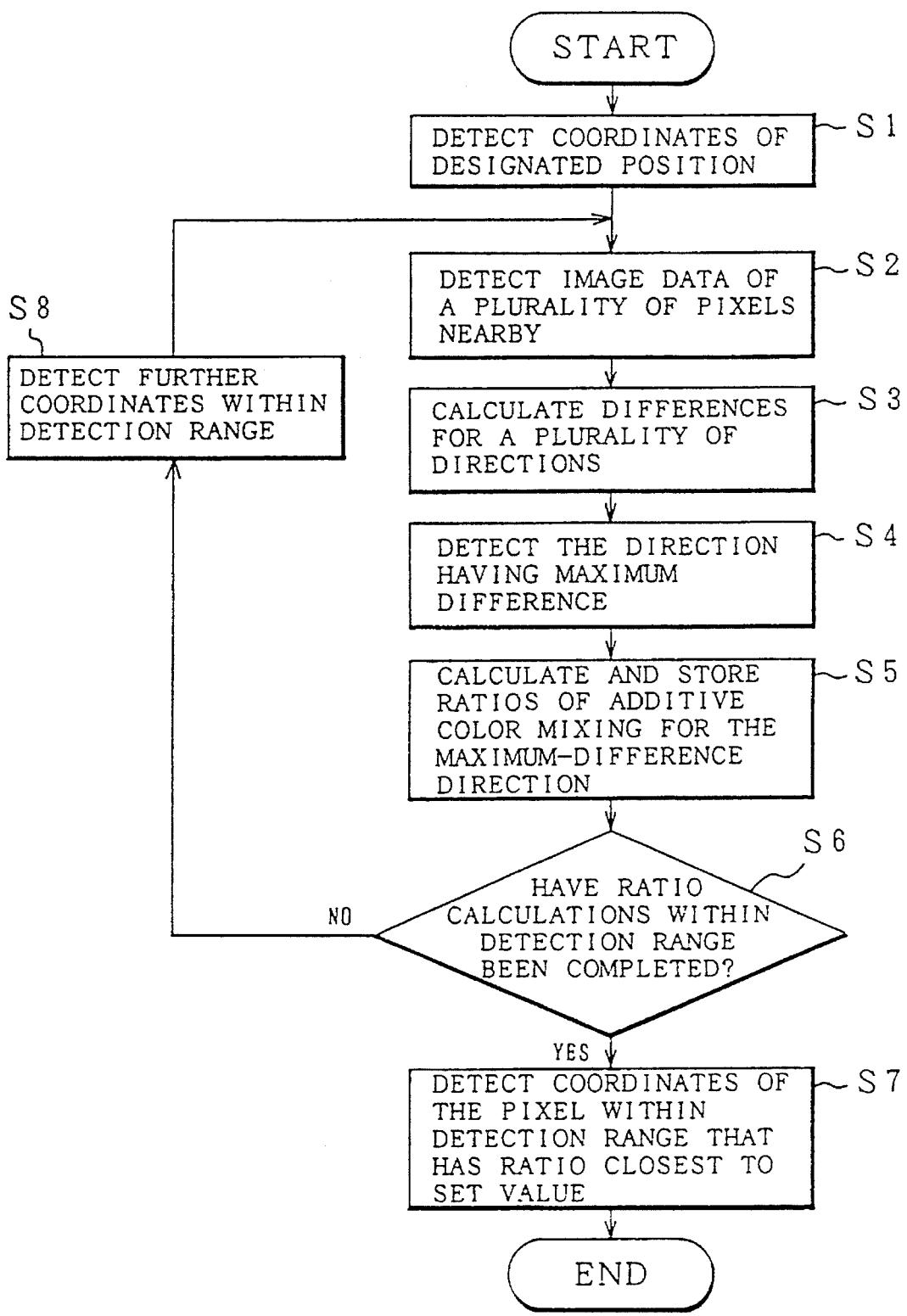
FIG. 12 is a flowchart showing a second embodiment of a boundary detection process of the object-contour detection shown in FIG. 3.

FIG. 12 is a flowchart showing in detail a second embodiment of a boundary detection process which may be effected in Step S2 shown in FIG. 3. The second embodiment of boundary detection is characterized in that a boundary point is detected by using the ratio at which an object color and a background color are mixed together by an additive process in a boundary region of the image. Referring to FIG. 12, in Step S1, the coordinates of a position designated by the operator are detected. In Step S2, image data of a plurality of detection pixels near a boundary-detection pixel serving as a sampling pixel, are detected, similarly to the first embodiment of boundary point detection process shown in FIG. 6. In Step S3, the difference of image data between the boundary-detection pixel and each of the detection pixels nearby is calculated for one of a plurality of directions. In Step S4, the direction in which the maximum of the calculated differences is present, is detected. Then, in Step S5, the image data of the pixels nearby are expressed by an additive color process by using image data on an object color and that on a background color, and the color mixing ratios of those pixels lying in the direction having the maximum difference are calculated and stored. The Steps S2 to S5 are repeatedly executed by employing each of subsequent sampling pixels which is within the detection range and which is detected in Step S8 until it is determined, in Step S6, that ratio calculations have been completed at all the pixels within the detection range. When ratio calculations have been completed at all the pixels within the detection range, Step S7 is executed, in which the pixel within the detection range which has an additive color mixing ratio closest to a previously set value of the color mixing ratio, e.g., 0.5, is detected as a boundary pixel.

Figure 13:
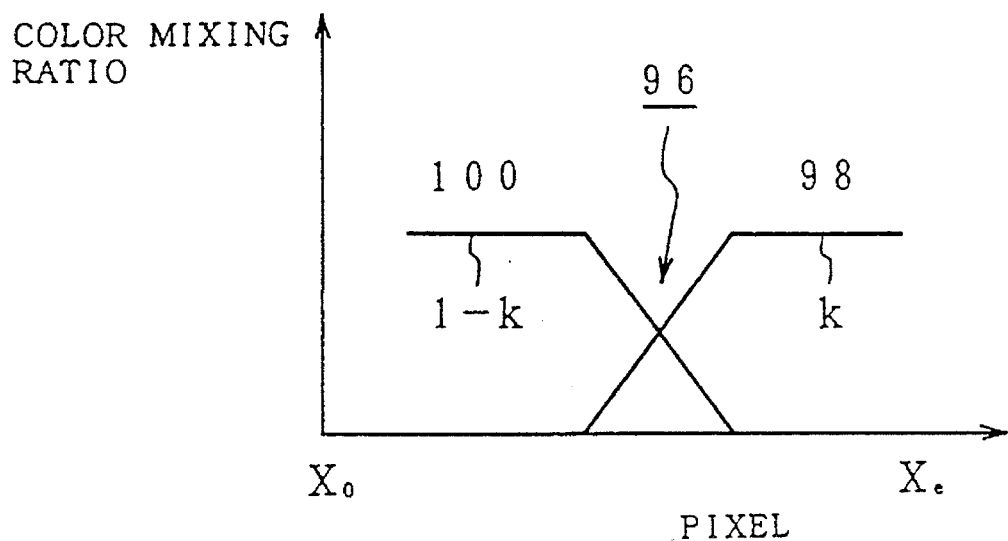
FIG. 13 is a graph for explaining the color mixing ratio at which an object color and a background color are mixed with each other at a boundary portion.

FIG. 13 shows a model of the additive color mixing ratio between an object color and a background color which is used in the second embodiment of boundary point detection process shown in FIG. 12. As shown in FIG. 13, an object color is mixed with a background color in a boundary region 96 in which the object color changes into the background color. When the degree by which the object color and the background color are mixed with each other is modeled by the ratio k (k=0 to 1) of the object color relative to the background color, the value of the object color ratio (denoted by reference numeral 98 in FIG. 13) linearly decreases from k=1 to k=0 as the position of sampling shifts from a first side of the boundary region 96 close to the object to the second side close to the background. On the other hand, the value of the background color ratio expressed as (1−k) (denoted by reference numeral 100 in FIG. 13) linearly increases from (1−k)=0 to (1−k)=1 as the sampling position shifts from the first side of the boundary region 96 to the second side thereof. Therefore, in a boundary region, the object color and the background color have an interrelationship which can be expressed by the following equation (1) by using the above ratios k and (1−k):

Background color=$k$×(object color)+(1−$k$)×(background color)  (1)

In this model of the color mixing ratio, a value of the color mixing ratio expressed as k=0.5 indicates the center of the mixed region at which the object color and the background color are mixed at the same proportion, that is, indicates a boundary 94. Thus, when color mixing ratios of pixels $X_0$ to $X_e$ arranged from the side close to the background to the side close to the object are calculated, and the pixel having, among the pixels $X_0$ to $X_e$, the color mixing ratio closest to a set value is detected as a boundary pixel, a point on the object-contour can be detected.

Figure 14:
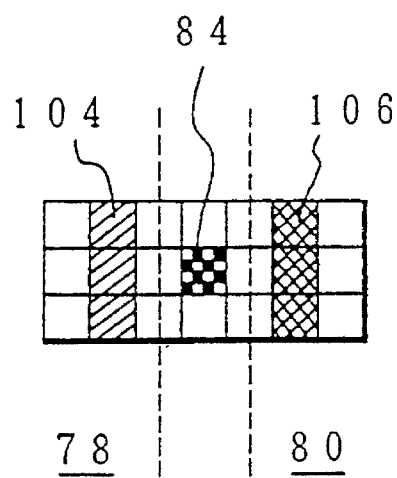
FIG. 14 is a view for explaining the detection of differences between a boundary-detection pixel and a mean of a plurality of pixels nearby.

FIG. 14 shows a second embodiment of Step 2 shown in FIG. 6 and FIG. 2 which is performed to detect image data of a plurality of pixels near a point designated by the operator. As shown in FIG. 14, in the second embodiment of image data detection, data 104 and data 106 are each detected as a mean of image data of three pixels which are vertically are arranged on a corresponding side of a boundary-detection pixel 84 and which are one pixel distant from the boundary-detection pixel 84. Then, the difference between the image data of the boundary-detection pixel 84 and each of the mean image data 104 and 106 of a corresponding group of pixels is calculated. In this way, when such mean image data are obtained from of three-pixel groups, it is possible to reduce the influence of noise which may be included in the image, and to effect more precise boundary detection. FIG. 14 shows obtaining mean image data from detection pixels on either side of the boundary-detection pixel 84 in the main scanning (horizontal) direction. Although not shown, mean image data may be obtained similarly from three-pixel groups with respect to the sub-scanning (vertical) and oblique directions shown in FIGS. 8 and 9, respectively. Although in FIG. 14, a piece of mean image data is obtained from three pixels, the data may be obtained from a group of a larger number of pixels so as to further reduce the influence of noise.

5. First Embodiment of Object-Contour Detection

When a boundary point has thus been detected on the basis of the point designated by the operator, the contour of the object is detected by tracking the periphery of the object from the boundary point. The manner in which an object-contour is detected, that is, the manner in which boundary determinations are accumulated, should be varied by selecting a different method appropriate for the type of image being processed.

Images which can be processed are divided into the following types when viewed from the object vs. background characteristics thereof:

I) Image type having a plain background and a clear contour

II) Image type having a complicated background and an unclear contour

III) Image type having a boundary between the object and the background which is made indistinct by a shadow portion, etc. According to the present invention, different object-contour detection methods which are optimal for image types I) to III) are previously set, so that an appropriate one of the methods can be selected to detect the contour of the desired object in the relevant image.

Figure 15:
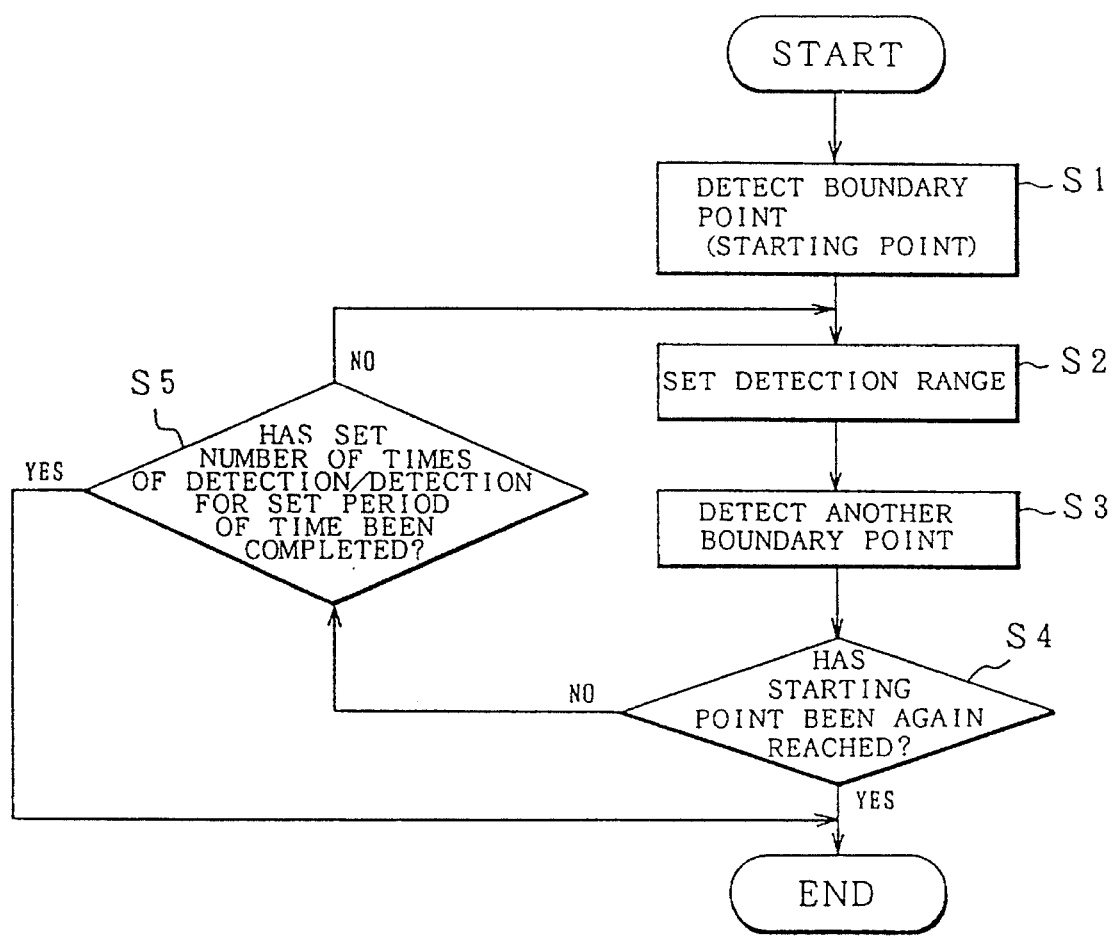
FIG. 15 is a flowchart showing a first embodiment of a contour detection process of the object-contour detection shown in FIG. 3.

FIG. 15 is a flowchart showing a first embodiment of an object-contour detection process which may be effected in Step S3 shown in FIG. 3, and in which the contour of the relevant object is tracked from the boundary point that has been detected in either the boundary point detection process shown in FIG. 6 or that shown in FIG. 12. Referring to FIG. 15, in Step S1, the detected boundary point is retrieved, and set as the starting point from which the object-contour will be tracked. Then, in Step S2, a previously determined detection range is set around the boundary point. In Step S3, a process which is the same as either the first embodiment (FIG. 6) or the second embodiment (FIG. 12) of boundary point detection process, is used to detect a new boundary point. Subsequently, in Step S4, a determination is made as to whether or not the starting point has been again reached, and the processes of Steps S2 and S3, that is, the setting of a detection range and the detection of a new boundary point, are repeatedly performed until the starting point is again reached. Before returning from Step S4 to Step S2, Step S5 is executed to determine whether an object-contour detecting operation comprising detection range setting and new boundary point detection has been effected either a previously set number of times or for a previously set period of time. If the object-contour detecting operation has been effected either the set number of times or for the set period of time, the execution of the process is forcibly terminated even when the starting point has not been again reached.

Figure 16:
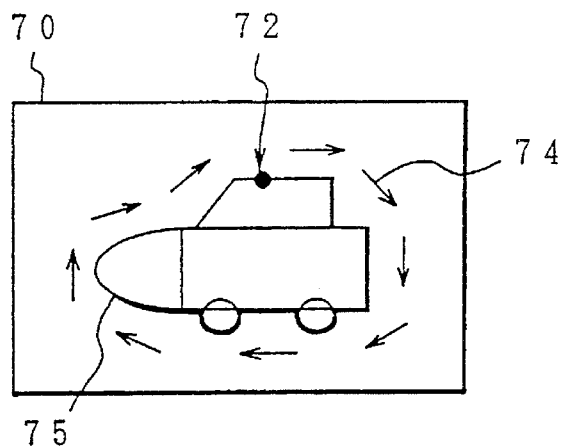
FIG. 16 is a view for explaining contour tracking on the basis of a designated point.

FIG. 16 shows the object-contour detection shown in FIG. 15. First, the designated point 72 is set as the starting point. Then, the setting of a detection range and the detection of a new boundary point are repeatedly performed following the periphery of the object (e.g., vehicle 75), whose contour is being detected, in a tracking direction 74 indicated by arrows in FIG. 16. When the designated point 72 set as the starting point has been again reached, a series of object-contour detecting operations is terminated.

Figure 17:
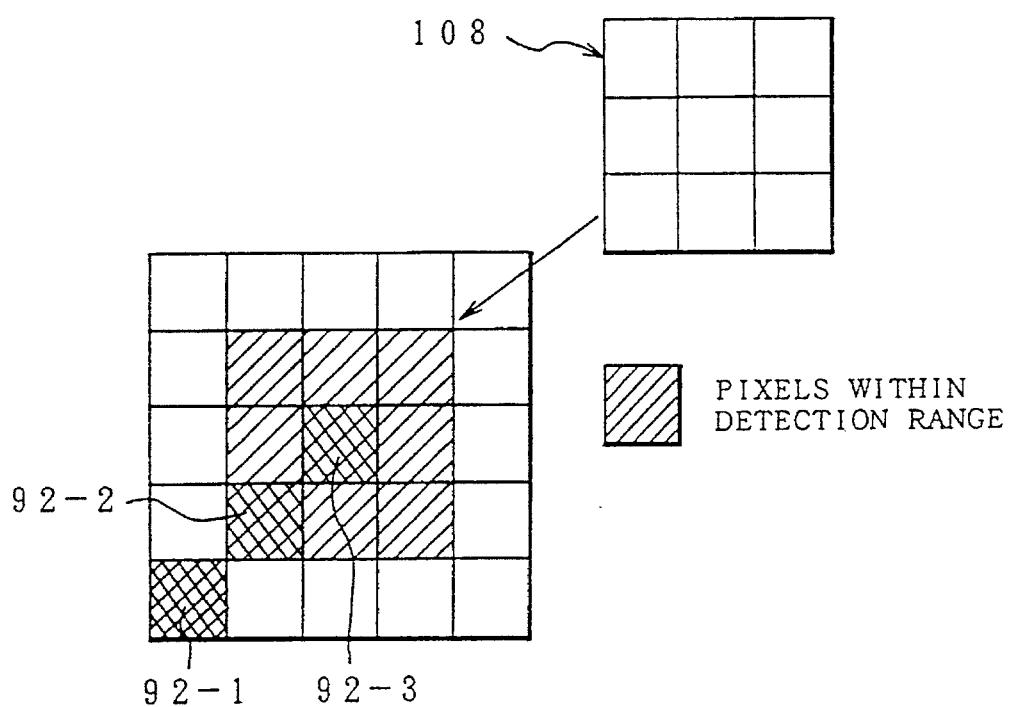
FIG. 17 is a view for explaining a detection range set in contour tracking.

FIG. 17 shows a manner in which a detection range is set after a boundary point has been detected in the object-contour detection shown in FIG. 15. When contour pixels 92-1, 92-2 and 92-3 have been subsequently detected by a series of operations each comprising the setting of a detection range and the detection of a boundary point, another detection range is set around the last contour pixel 92-3 serving as the starting point. Each detection range is set by using a reference mask 108 comprising, as shown in an upper right portion of FIG. 17, a (3×3) matrix of nine pixels in total, and by aligning the central pixel of the mask 108 with the relevant contour pixel 92-3, so that the subsequent contour pixel can be selected from among the eight peripheral pixels hatched in FIG. 17. In the illustrated example, the contour pixel 92-2, which is at the lower left corner of the reference mask 108 and which has already been processed, is excluded from the choice, and the subsequent contour pixel is, in fact, selected from among the remaining seven pixels. The subsequent contour pixel is selected in the following manner: the seven pixels are subjected to the calculation of either differences of the image data of the pixels or the color mixing ratio of the image data of the pixels by the same process as the process for boundary point detection shown in FIG. 6 or FIG. 12 except that each of the seven pixels replaces a boundary-detection pixel; and the pixel having either the maximum difference or the color mixing ratio closest to a set value (i.e., 0.5) is detected as the new contour pixel in a boundary. Although, in the example shown in FIG. 17, a detection range comprises eight pixels in the periphery of the previously-detected contour pixel, a detection range comprising four surrounding pixels (left and right, and upper and lower pixels) may be used.

In Step S5 shown in FIG. 15, the tracking is forcibly terminated when the object-contour detection has been effected either a set number of times or for a set period of time. This arrangement is provided because the object-contour detection may either fall into an endless loop or have an end portion of the image reached as a result of tracking, thereby becoming unable to terminate. When the contour includes a branch portion at which contour lines intersect each other, designation of a plurality of points, instead of the designation of one point 72 shown in FIG. 16, makes it possible for the entire contour to be detected including the branch portion. Alternatively, designation of one point 72 may be used even when the contour has a branch portion. In this case, since at least two contour pixels are obtained at the branch portion, these contour pixels are stored as first, second, etc. starting point candidates. Tracking is first effected from the first starting point candidate, and, when that point is again reached, tracking is then effected from the second, etc. starting point candidate(s).

6. Second Embodiment of Object-Contour Detection Process

Figure 18:
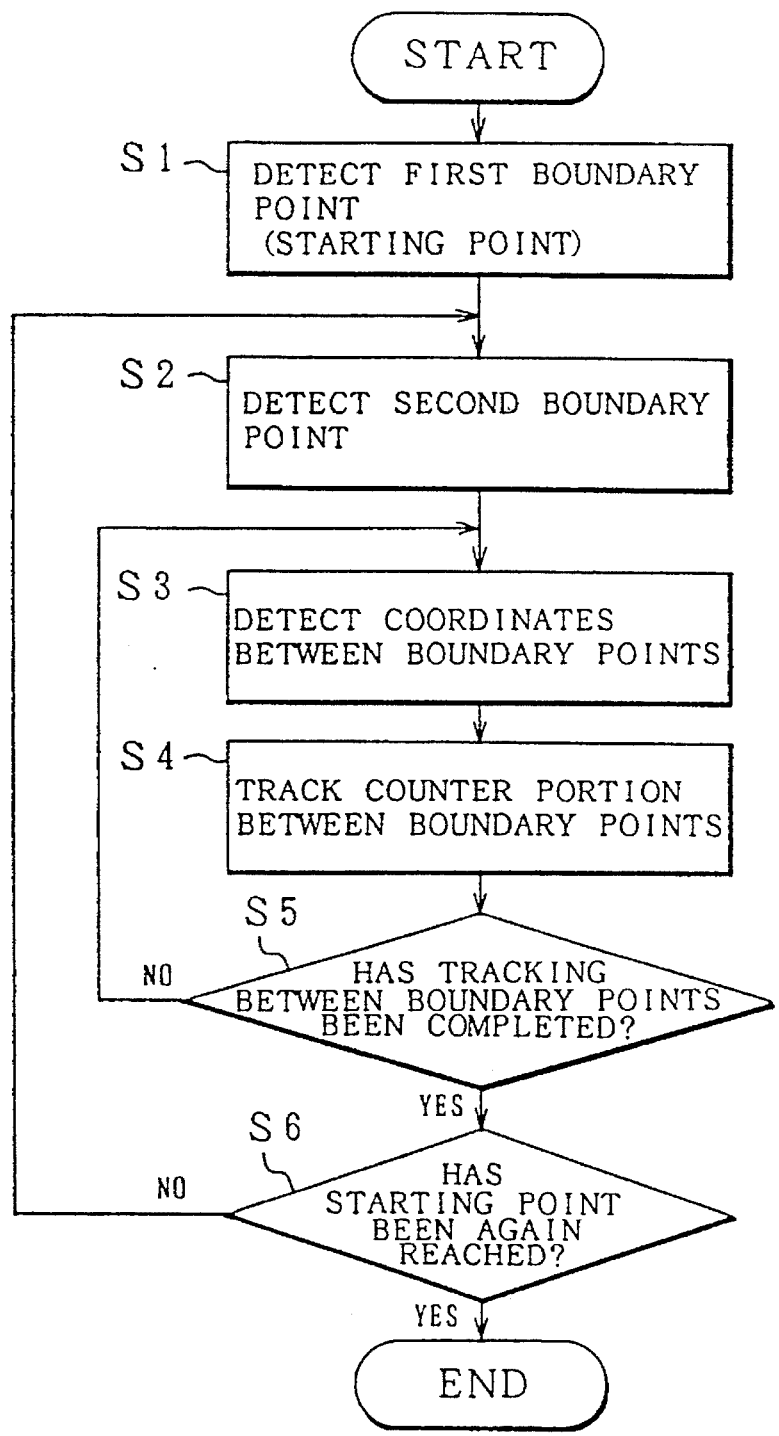
FIG. 18 is a flowchart showing a second embodiment of a contour detection process of the object-contour detection shown in FIG. 3.

FIG. 18 is a flowchart showing a second embodiment of an object-contour detection process which may be effected in Step S3 shown in FIG. 3. The second embodiment of object-contour detection process is characterized in that the contour of the relevant object is detected by tracking the periphery of the object on the basis of designation of a plurality of boundary points. Prior to executing the process of object-contour detection shown in FIG. 18, the operator designates a plurality of points along the periphery of the object, whose contour is to be detected, in the image displayed on the monitor screen. When a plurality of points have thus been designated, in Step S1 shown in FIG. 18, a boundary point is detected on the basis of one of the plurality of designated points in either the manner shown in FIG. 6 or the manner in FIG. 12, and the thus detected boundary point is used as the starting point. Then, in Step S2, on the basis of another designated point, another boundary point is similarly detected. Subsequently, in Step S3, each of a plurality of coordinate points equally dividing a line interconnecting the two boundary points is obtained as a point capable of serving as a designated point, and in Step S4, a further boundary point is detected on the basis of the relevant coordinate point on the interconnecting line in either the manner shown in FIG. 6 or that shown in FIG. 12 so as to track a contour portion. In Step S5, it is determined whether or not contour portion tracking between the two boundary points has been completed. Steps S3 and S4 are repeated until the answer to the question of Step S5 becomes affirmative. When it is determined, in Step S5, that the contour portion tracking between the two boundary points has been completed, Step S6 is executed, in in which a determination is made as to whether or not the starting point has been again reached. If the starting point has not been again reached, Step S2 is repeated to detect still another boundary point which is ahead of the interconnecting line in the tracking direction, and tracking of another contour portion is performed in Steps S3 to S5. Steps S2 to S5 are repeated in this way until the starting point is again reached, whereupon the execution of the process is terminated.

The second embodiment of object-contour detection shown in FIG. 18 is effective when processing an image having an object whose contour cannot be properly detected if only one point is designated as the starting point by the operator. Specifically, when the relevant image has a complicated background and an unclear contour, or when the image has a boundary between the object and the background which is indistinct due to a shadow portion of the object, etc., designation of a plurality of points by the operator aids for correct detection of the object-contour. The operator may, of course, roughly designate a plurality of points near the periphery of the object, and accurate detection of each boundary point is performed by the computer in the manner shown in FIG. 6 or FIG. 12. Therefore, designating a plurality of points does not create additional burden on the operator, nor does it require experience.

Figure 19:
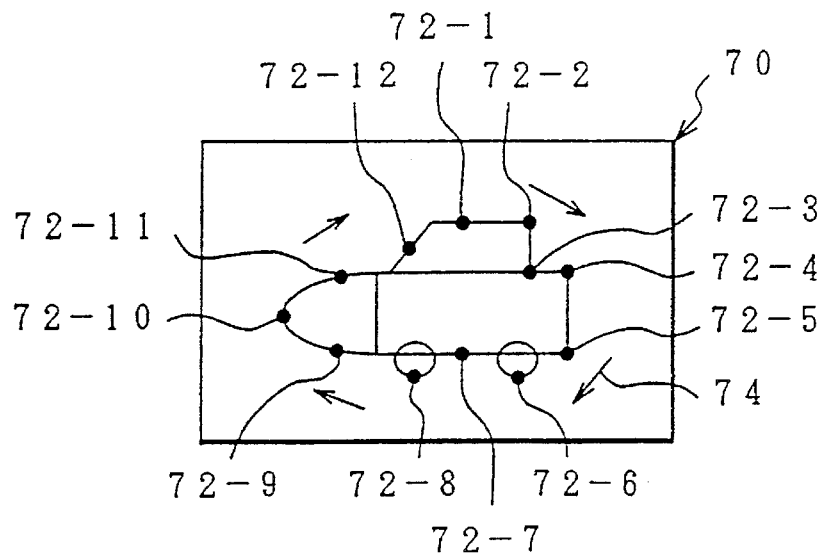
FIG. 19 is a view for explaining contour tracking on the basis of designation of a plurality of points.

FIG. 19 shows designation of a plurality of points by the operator before the object-contour detection shown in FIG. 18. Points 72-1 to 72-12 are designated along the periphery of an object (e.g., vehicle) on the monitor screen 70. The point 72-1, which is designated first, serves as the starting point, and the designated point 72-12 serves as the last designated point.

Figure 20:
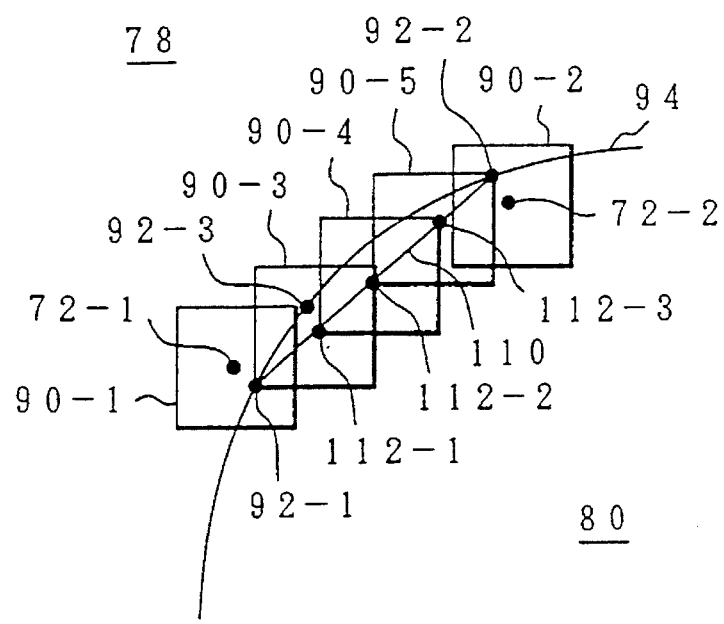
FIG. 20 is an explanatory views showing in detail contour tracking between two of the designated points shown in FIG. 19.

FIG. 20 shows details of contour portion tracking between two of the designated points shown in FIG. 19, that is, the designated points 72-1 and 72-2. First, a detection range 90-1 is set around the designated point 72-1, and a first boundary pixel (boundary point) 92-1 to serve as the starting point is detected. Then, another detection range 90-2 is set around the second designated point 72-2, and a second boundary pixel (boundary point) 92-2 is detected. Subsequently, the equation expressing a straight line 110 interconnecting the two detected boundary pixels 92-1 and 92-2 is calculated. Then, the coordinates (X, Y) of a first coordinate point 112-1 on the interconnecting line 110 are calculated by incrementing the X coordinate of the first boundary pixel 92-1 by one, and calculating the corresponding Y coordinate of the coordinate point 112-1 on the basis of the equation of the interconnecting line 110. The coordinates of other coordinate points 112-2 and 112-3 on the line 110 are similarly calculated. When the plurality of coordinate points 112-1, 112-3 and 112-3, which are arranged in this order on the line 110 toward the second boundary pixel 92-2, have thus been set on the line 110, a detection range 90-3 is set for the first coordinate point 112-1, and a corresponding boundary pixel (boundary point) 92-3 is detected in either the manner shown in FIG. 6 or that shown in FIG. 12. Similarly, detection ranges 90-4 and 90-5 are respectively set for the second and third coordinate points 112-2 and 112-3, and corresponding boundary pixels are subsequently detected. In the tracking shown in FIG. 20, the coordinate points 112-1, 112-2, etc. are each set by incrementing the X coordinate by one and calculating a new Y coordinate in accordance with the line 110. However, when the interconnecting line has a relatively great gradient, the coordinate points may alteratively be set by incrementing the Y coordinate by one, and calculating a new X coordinate from the equation of the line 110. In the above description, a straight line is calculated on the basis of two boundary pixels so as to detect other boundary pixels between the first two boundary pixels. However, a curve may be calculated on the basis of three or more boundary pixels, and other boundary pixels between the first several boundary pixels may be detected on the basis of points on the curve. In the latter case, it is possible to reduce the number of points previously designated by the operator, to thereby further reduce burden on the operator.

Figure 21:
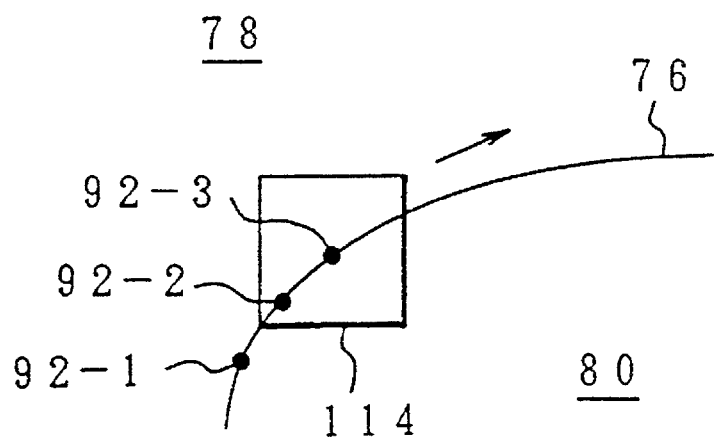
FIG. 21 is a view for explaining contour tracking performed when a contour region has been designated.

FIG. 21 shows a manner in which an object-contour may be tracked when the object, whose contour is to be detected, has been designated in the manner shown in FIG. 5. A certain form is provided to designate a range of an image when the form is overlapped with an image portion representing the desired object 80 on the monitor screen. For example, a rectangular cursor 114, which can be moved by operating the mouse, is displayed for this purpose. First, the operator moves the cursor 114 to a position which coincides with the object-contour 76 with a portion of the object-contour 76 contained in the cursor 114. Then, the operator commands, by a mouse clicking operation or the like, a boundary detection process et seq. to be performed. As the operator repeats such movement of the cursor 114 and such commanding, boundary pixels 92-1, 92-2, 92-3, etc. are subsequently detected in either the manner shown in FIG. 6 or that shown in FIG. 12. Thus, in object-contour detection in which the cursor 114 is moved along the periphery of the object, the operator is required to bear more burden than in object-contour detection employing designation of one point, designation of a plurality of points, or designation of colors (described later). However, the object-contour detection shown in FIG. 21 is effective when the image has a more unclear contour, and enables highly precise object-contour detection though burden on the operator increases.

Figure 22:
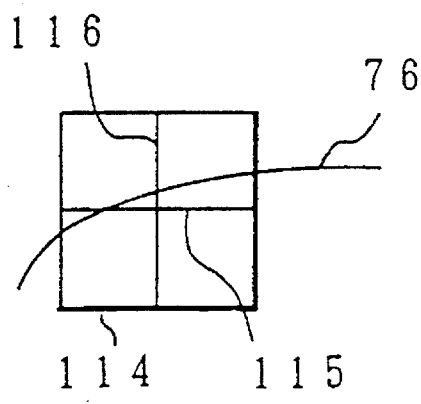
FIG. 22 is a view for explaining contour tracking employing a cursor having crossed lines.

FIG. 22 shows a modification of the cursor shown in FIG. 21. In this modification, a cursor 114' has crossed lines 116. With the arrangement shown in FIG. 21, since boundary determination is made at all the points within the range of the cursor 114', a relatively long time is required. In contrast, with the arrangement shown in FIG. 22, the central point 115 of the range of the cursor 114' is detected, and, in performing the process shown in FIG. 6 or FIG. 12, only those pixels on the crossed lines 116 are used as boundary-detection pixels. Thus, the provision of the crossed lines 116 assures that substantially all the boundary-detection pixels essential to boundary determination are included, and this feature permits boundary determination to be made only on the crossed lines 116, thereby enabling a processing period to be curtailed.

7. Third Embodiment of Object-Contour Detection

Figure 23:
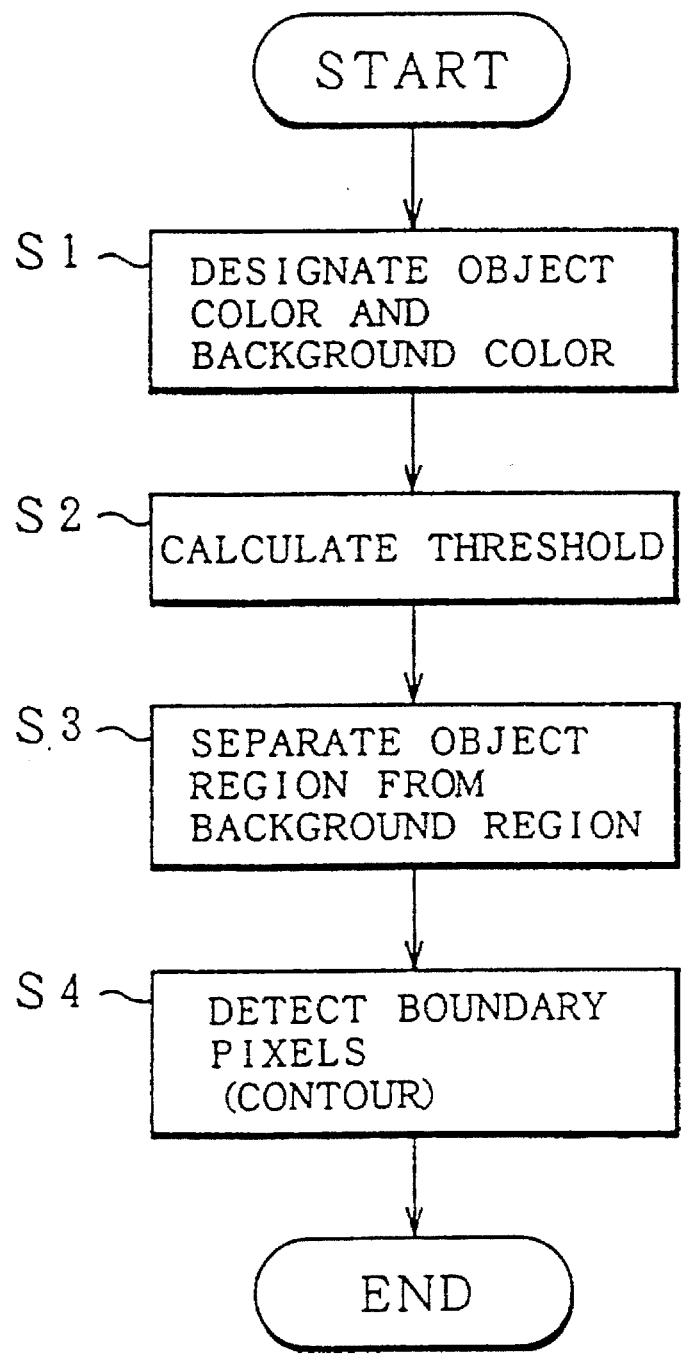
FIG. 23 is a flowchart showing a third embodiment of a contour detection process of the object-contour detection shown in FIG. 3.

FIG. 23 is a flowchart showing in detail a third embodiment of object-contour detection process which may be performed in Step S3 shown in FIG. 3. The third embodiment is characterized in that two points of an object color and a background color are designated, and the object-contour is detected by utilizing differences in color. First, in Step S1, the operator designates one point in that portion of the image representing the object whose contour is to be detected, and one point in another image portion representing the background of the object. On the basis of this designation, image data on an object color and image data on a background color at the individual designated points are obtained. Then, in Step S2, a threshold is calculated on the basis of the image data of the object color and that of the background color which have been obtained in Step S1. In Step S3, the calculated threshold is used to separate the entire image data into two regions comprising an object region and a background region. Subsequently, in Step S4, a boundary between the separated regions is detected as the contour of the object. The threshold used to separate the object region from the background region may comprise either a certain color mixing ratio or a mean of image data of the object region and image data of the background region.

The third embodiment of object-contour detection based on the object color and the background color is effective when the image has an object and the background thereof whose colors are apparently different.

Figure 24:
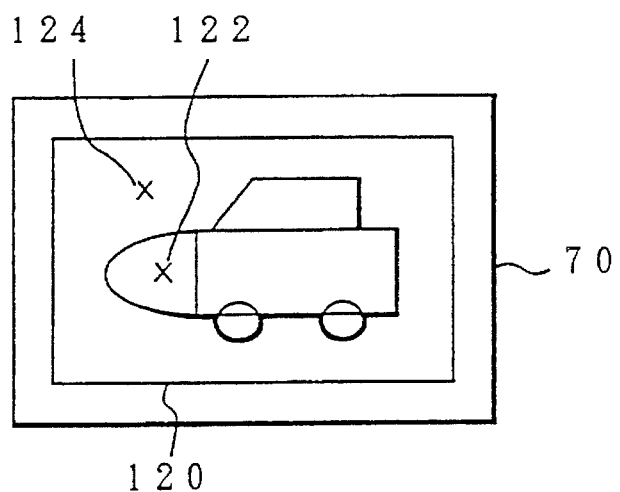
FIG. 24 is a view for explaining contour detection in which an object color and a background color are designated.

FIG. 24 shows the object-contour detection shown in FIG. 23. When the relevant image is displayed on the monitor screen 70, the operator designates, through a mouse or the like, a point 122 for obtaining a representative of the object color and a point 124 for obtaining a representative of the background color. On the monitor screen 70, a designation range 120, within which object-contour detection is to be performed on the basis of object and background colors, has previously been designated so that object-contour detection can be performed with respect to the designated part of the displayed image. When the points 122 and 124 have been designated, a threshold is calculated from image data on the colors at the designated points 122 and 124. Then, the image data of all the pixels within the designation range 120 are subjected to determination as to whether each item of the image data belongs to the object region or the background region. For example, in the case of a RGB color space, the threshold is calculated as expressed in the following equation (2) if the image data on the background color at the designated point 124 is $(R_0, G_0, B_0)$ and the image data on the object color at the designated point 122 is $(R_1, G_1, B_1)$:

$$\text{Threshold}=\{(R_0+R_1)/2, (G_0+G_1)/2, (B_0+B_1)/2\} \quad (2)$$

Such a threshold is used to make determination as to whether each item of image data belongs to the object region or the background region. Alternatively, a color mixing ratio of each pixel within the designation range 120 may be calculated in accordance with the model shown in FIG. 13, and determination as to which region each pixel belongs to may be made depending on the relative magnitude of the color mixing ratio of the pixel with respect to a set value. For example, when a pixel has a color mixing ratio equal to or more than 0.5, the pixel is determined to belong to the object region, and a pixel having a color mixing ratio smaller than 0.5 is determined to belong to the background region.

Figure 25:
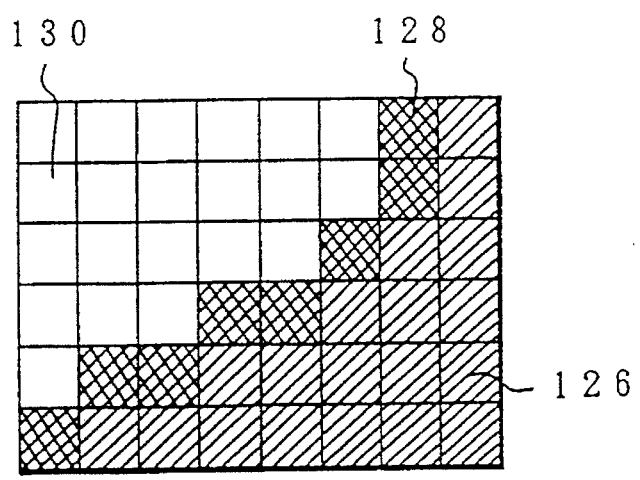
FIG. 25 is a view for explaining the setting of contour pixels in an image divided into a region of an object color and another region of a background color.

FIG. 25 shows a manner of detecting the object-contour on the basis of the results of object-background determination employing a threshold. In the illustrated example, when object pixels 126 have been separated from background pixels 130, those pixels positioned adjacent to the pixels 126 and 130 in the above two regions are detected as boundary pixels 128. A continuous collection of such boundary pixels is detected as the contour of the object.

Figure 26A:
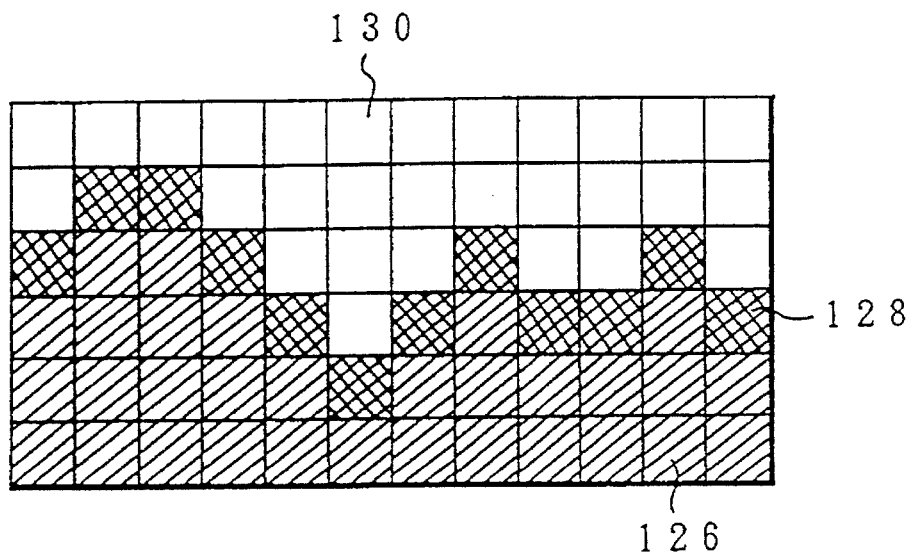
FIGS. 26A and 26B are views for explaining smoothing of a detected contour.
Figure 26B:
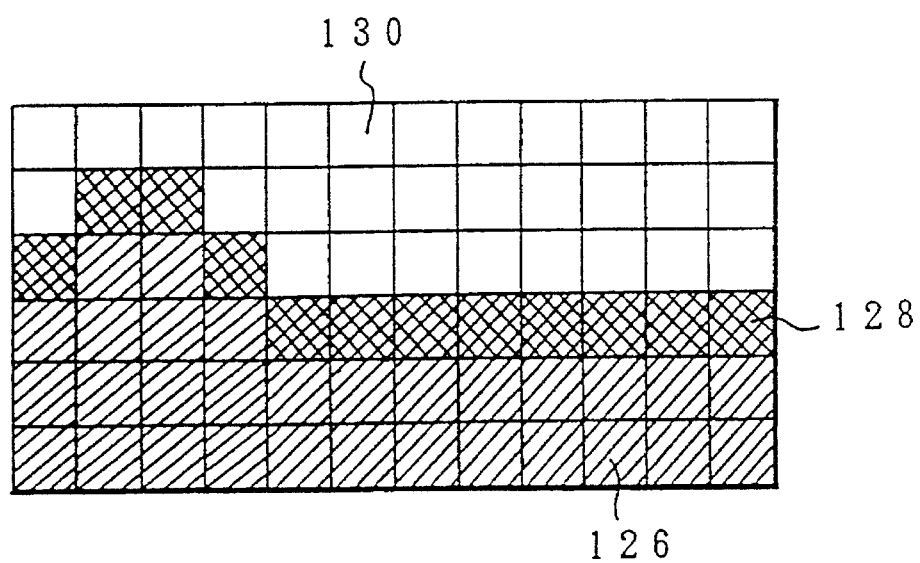

FIGS. 26A and 26B show a smoothing procedure of an object-contour which has been detected by any of the embodiments shown in FIG. 15, FIG. 18 or FIG. 23. The object-contour which has been detected by one of these embodiments generally has a severely notched edge presented by boundary pixels 128, as shown in FIG. 26A. Before the original image is subjected to object-contour detection, however, the object-contour appears to be smooth as viewed by human eye. This difference comes from the following reason: The actual area of a boundary portion includes two to three pixels. However, when this boundary portion is detected as a one-pixel area, the resultant boundary may not necessarily be smooth. A detected object-contour is severely notched particularly when the boundary is indistinct due to a shadow portion, and the boundary pixels include many pixels which require object-background determinations. When boundary pixels 128 presenting a severely notched edge, as shown in FIG. 26A, are subjected to a smoothing procedure, as shown in FIG. 26B, the boundary pixels 128 can be smoothly arranged. This makes it possible to improve the quality of an image obtained by a subsequent image processing such as composition with another image, enlargement, or reduction. In the smoothing procedure shown in FIGS. 26A and 26B, it is effective to obtain a curve approximating the object-contour from the detected boundary pixels 128 by a least squares method.

Figure 27:
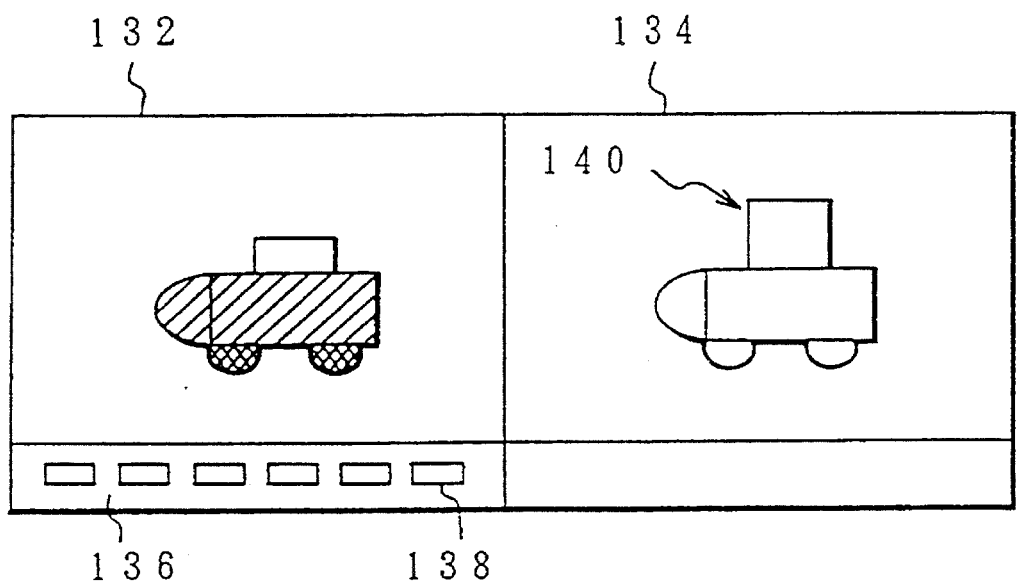
FIG. 27 is a view for explaining correction of a detected contour.

FIG. 27 shows an object-contour correction procedure performed in the final step of an object-contour detection process according to the present invention. When the results of object-contour detection are displayed on the monitor screen, the detection results may be erroneous, as shown in FIG. 27. Referring to FIG. 27, the monitor screen has an original image display section 132 provided, for example, on the left side thereof, and an object-contour detection result display section 134 is provided on the other side thereof, so that the original image and the detected contour can be compared with each other. In the illustrated example, the detection results include a detection error 140 which is not true to the original image. According to the present invention, in order to cope with errors of the results of object-contour detection, a command button section 136 including a correction mode selection button 138 is provided, for example, below the original image display section 132. When a detection error, such as the error 140, has been found, the correction mode selection button 138 is actuated by, for example, setting the cursor on that button 138 and clicking the mouse thereon, thereby selecting a mode for correcting the detection error (e.g., error 140) displayed on the object-contour detection result display section 134.

Figure 28A:
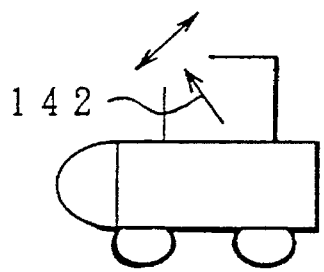
FIGS. 28A, 28B and 28C are views for explaining manners of correcting a detected contour.
Figure 28B:
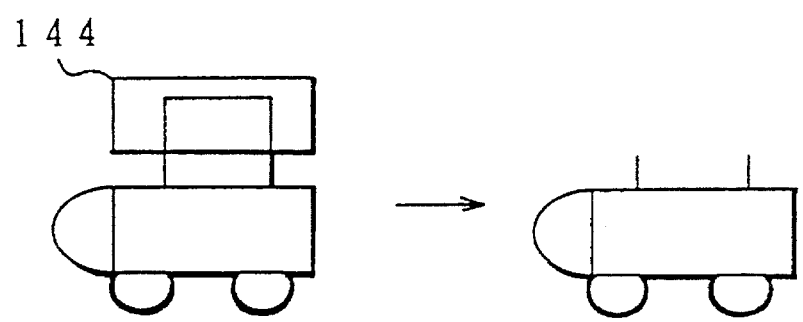
Figure 28C:
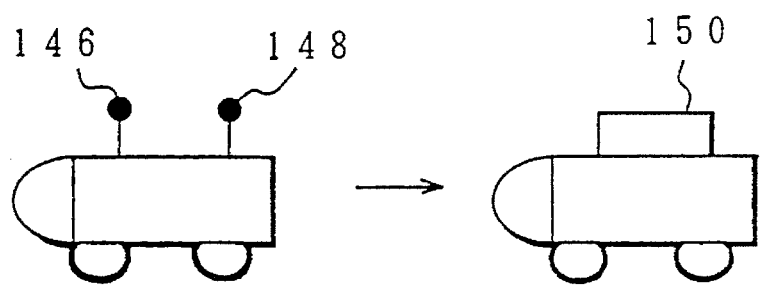

FIGS. 28A, 28B and 28C show various manners of correcting an error of the object-contour detection results. First, a contour portion regarded as a detection error is deleted in either the manner shown in FIG. 28A or the manner shown in FIG. 28B. The former is the so-called "eraser" process in which the relevant error portion is "erased" by causing, through the mouse, a cursor 142 to suitably move on the error portion. The latter is a regional deletion in which the relevant error portion is deleted by setting a designated region 144 thereon. Then, re-detection such as that shown in FIG. 28C is performed. Two points 146 and 148 are designated on the contour resulting from deletion, and are interconnected, to thereby newly detect a contour line 150.

8. Embodiments for Detecting Object-Contour as Area

Figure 29:
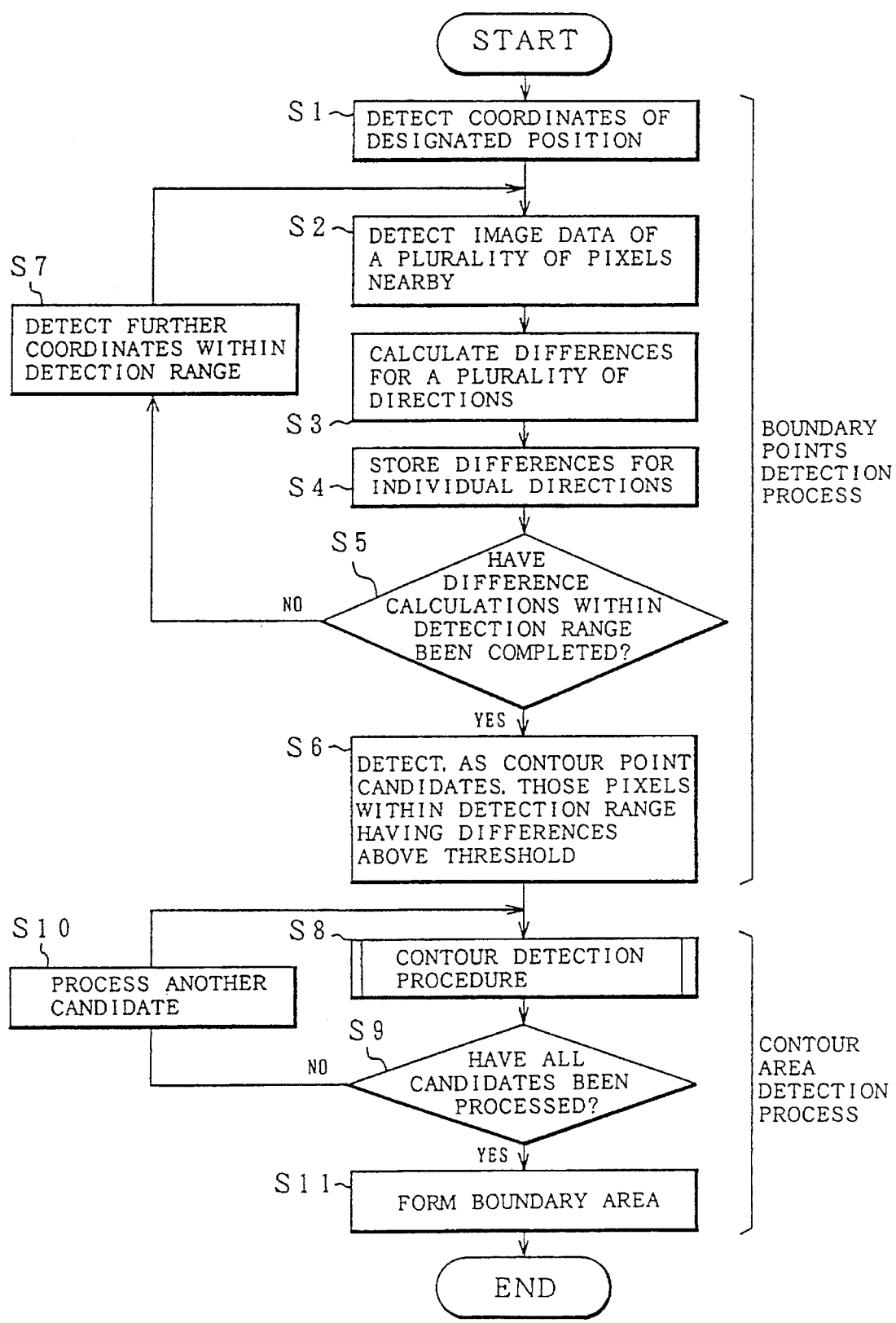
FIG. 29 is a flowchart showing a first embodiment of object-contour detection in which an object-contour having width is detected.
Figures 30A, 30B, 30C:
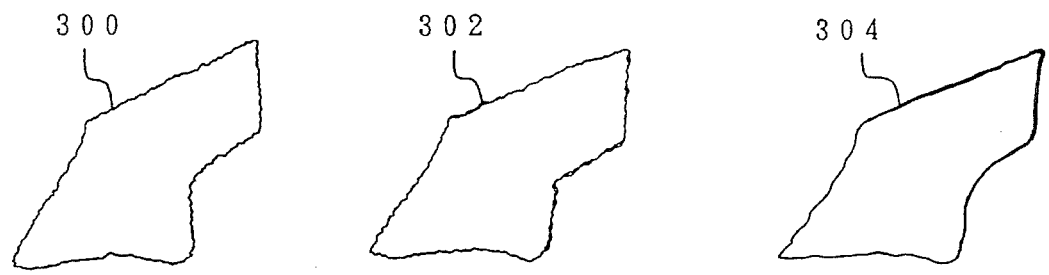
FIGS. 30A, 30B and 30C are views for explaining a contour of a one line, a contour of a plurality of lines, and a contour of a line having width, respectively.
Figure 34:
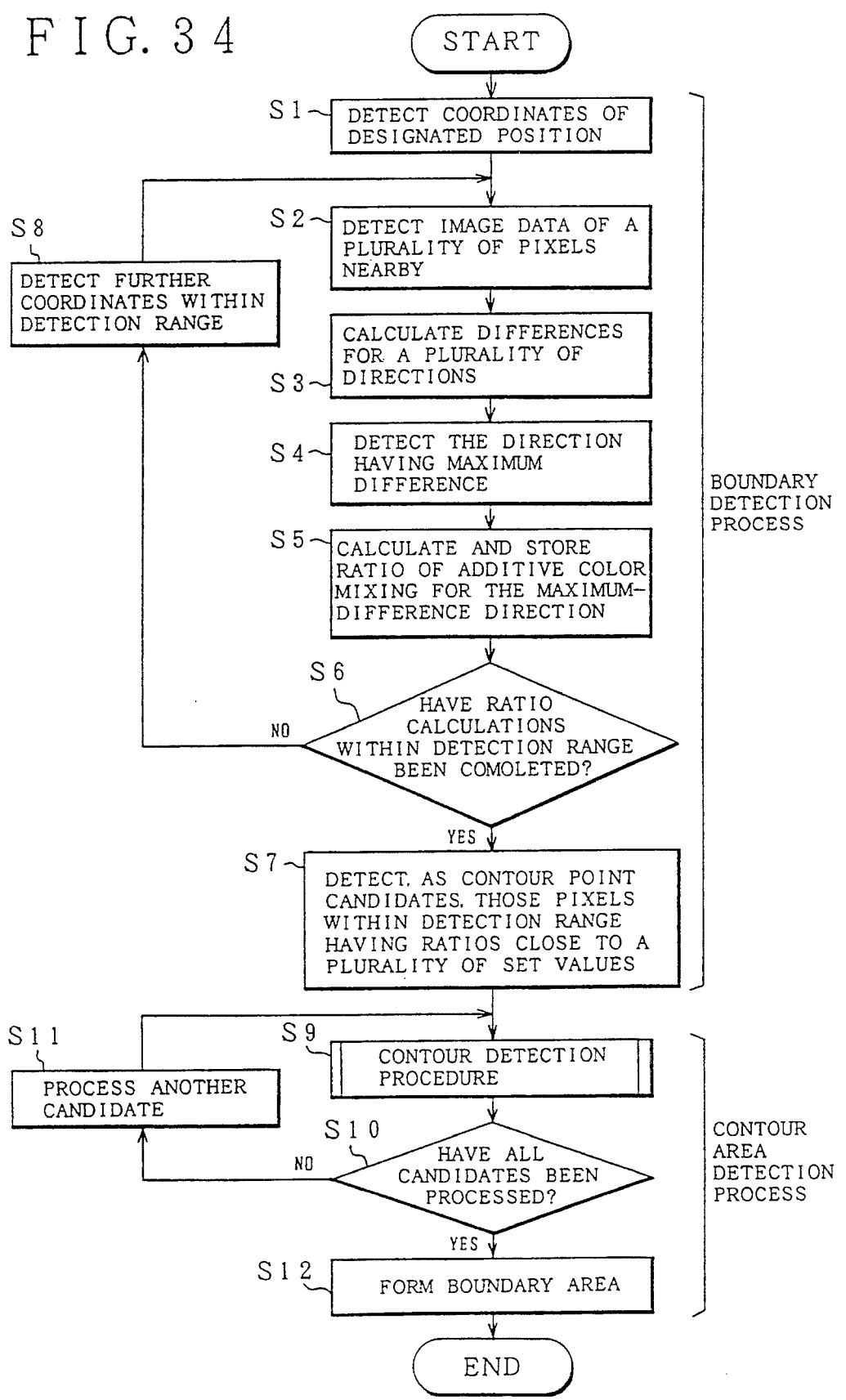
FIG. 34 is a flowchart showing a second embodiment of object-contour detection in which an object-contour having width is detected.

FIGS. 29 and 34 are flowcharts showing other embodiments of object-contour detection, each embodiment including a combination of a boundary detection process and a object-contour detection process. These embodiments are characterized in that the contour of the relevant object is detected as an area having certain width. Such detection of an object-contour as an area may be performed for the following reasons: The combination of a boundary point detection process shown in either FIG. 6 or FIG. 12 and an object-contour detection process shown in either FIG. 15 or FIG. 18 may result in the detection of a zigzag object-contour, as shown in FIG. 30A. A detected object-contour is not smooth but zigzag when, for instance, the boundary between the object and the background has a portion continuous with a shadow portion and, accordingly, the object-contour is indistinct. In addition, in the object-contour detection described above, pixels on the periphery of the object are processed for object-contour detection. However, the width of an area in which an object color changes into a background color may not necessarily be constant at all the positions on the periphery of the object, and may be relatively great or small at some positions. As a result, where the area is wide, a zigzag contour portion may be detected. With the above-described embodiments of object-contour detection, therefore, a zigzag object-contour may be detected from a certain type of image, thereby involving the risk of impairing the level of precision of object extraction which will be subsequently performed. There is another risk that an area for being subjected to a color mixing process so as to reproduce color naturalness at a boundary may be too narrow to impart a sufficiently natural appearance to the processed image.

In these embodiments, when there is a relatively wide contour area, that is, when an object color changes into a background color in a relatively wide area, an object-contour having a width (thickness) corresponding to that of the color-change area is detected. This arrangement enables a contour portion which is indistinct due to a shadow or the like to be detected as an appropriately thick contour. Accordingly, when an area where such changes in color occur is detected as a contour area, the detected contour area is not zigzag. Thus, it is possible to perform highly precise object-contour detection, and hence, highly precise object extraction based on the object-contour detection. Further, the results of the detection of a contour area with certain width may be used in a post-extraction processing performed in the image processor, such as color adjustment or image composition, to obtain mask data on a boundary region that indicates color mixing ratios in the relatively wide area where color changes occur. When such mask data is used to calculate a color of a boundary region, it is possible to provide a relatively wide contour area having as smooth changes in color as those in the original image.

In the embodiment shown in FIG. 29, a contour area with certain width is detected in the following manner. Steps S1 to S6 constitute a boundary points detection process, which is basically similar to the first embodiment of boundary detection process shown in FIG. 6. The process shown in FIG. 29 is distinguished from the process shown in FIG. 6 in that, in Step S6 (FIG. 29), those pixels within the detection range having differences above a threshold are detected as contour point candidates. In contrast, in Step S6 shown in FIG. 6, that pixel within the detection range having the maximum difference is detected, hence, only one pixel is detected. The boundary points detection process shown in FIG. 29, in which all the pixels having differences above a prescribed threshold are detected, results in the detection of at least one contour point candidate. If the contour has certain width, the process shown in FIG. 29 detects two or more contour point candidates.

Figure 31A:
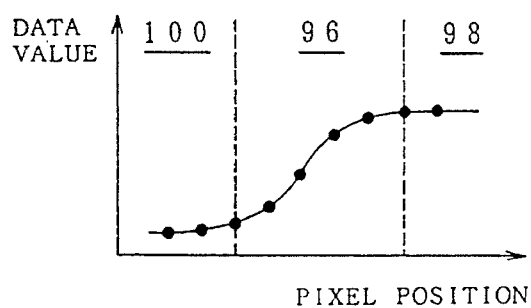
FIGS. 31A and 31B are graphs showing the relationship between the position of pixels in a boundary portion and data values, and the relationship between such pixel position and differences, respectively.
Figure 31B:
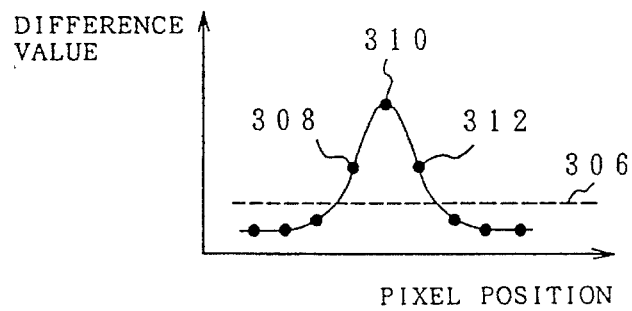

FIGS. 31A and 31B respectively show the relationship between the data value and the position of pixels in a boundary portion detected in the boundary points detection process (S1 to S6) shown in FIG. 29, and the relationship between the differences in the data value and the pixel position. As shown in FIG. 31A, when pixel data value increases in a boundary region 96 as the pixel position shifts from a region of a background color 100 to a region of an object color 98, the differences in the data value change in such a manner as to have a peak in the boundary region 96. Therefore, a certain threshold of data difference, such as a threshold 306, is set, and those pixels having differences exceeding the threshold 306 are detected as contour point candidates. In the illustrated example, three pixels corresponding to difference values 308, 310 and 312 are detected as contour point candidates.

Figure 32A:
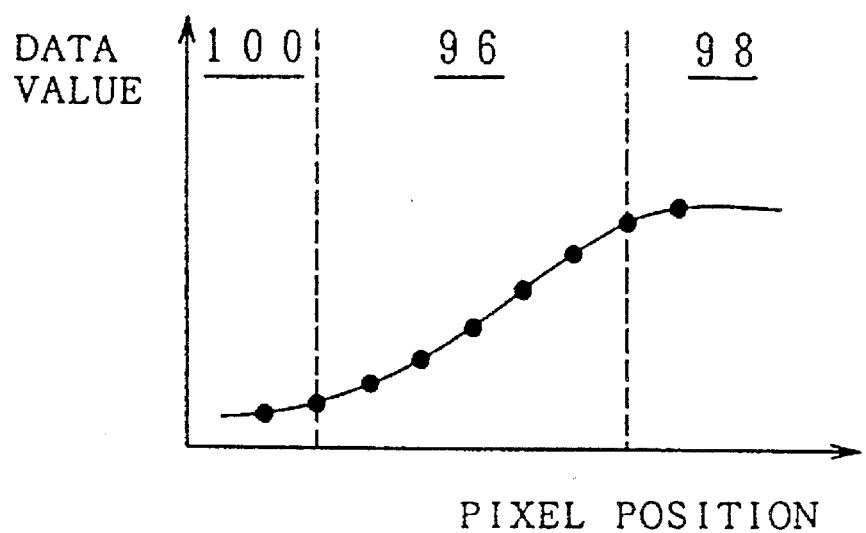
FIGS. 32A and 32B are graphs showing the relationship between the position of pixels in a boundary portion with gradual color changes and data values, and the relationship between such pixel position and differences, respectively.
Figure 32B:
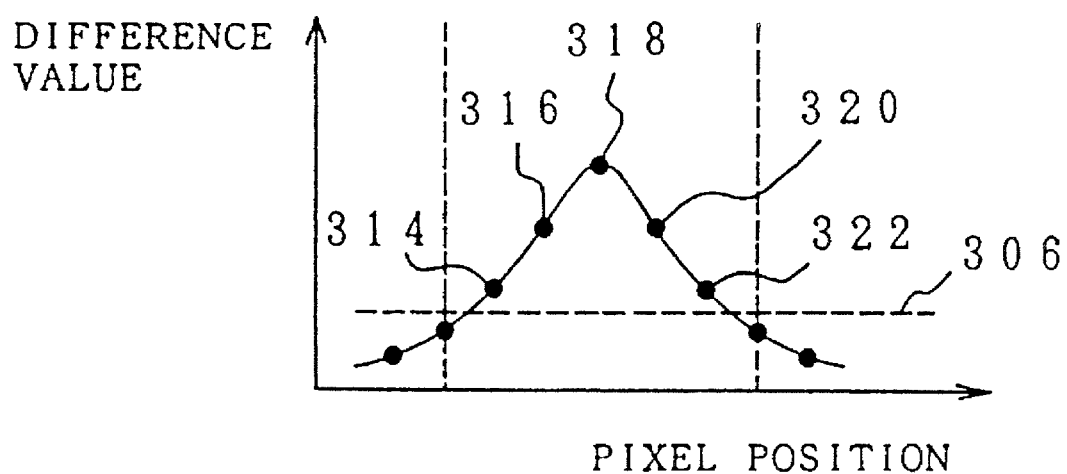

FIGS. 32A and 32B together show the relationship between the pixel data and the differences in the data assumed when the pixel data value changes more gradually than that in FIG. 31A as the pixel position shifts from the background color 100 to the object color 98, that is, when the boundary region 96 is relatively wide. In this case, the pixel data differences shown in FIG. 32B change as gradually as the boundary region 96 is wide. When the same threshold 306 of data difference as that shown in FIG. 31B is set, because of the relatively wide boundary region 96, five pixels corresponding to difference values 314, 316, 318, 320 and 322 are detected as contour point candidates.

Pixels, such as those shown in FIGS. 31A or 32A, which have differences exceeding the threshold 306 and which have been detected as contour point candidates are indexed, so that the candidate 310 or 318 having the peak difference, the candidates of second greatest difference that are on either side of the peak, and the candidates of third greatest difference that are on either side of the peak can be distinguished from each other in the subsequent process of contour detection. For example, when there are five candidates as described above, the peak-difference candidate is indexed as $ID_0$, the two second-greatest-difference candidates are indexed as $ID_1$ and $ID_2$, e.g., from the right side to the left, and the two third-greatest-difference candidates are indexed as $ID_3$ and $ID_4$, e.g., from the right side to the left.

Subsequently, in Steps S8 to S11 shown in FIG. 29, a contour area detection process is performed. The contour area detection process is basically the same as the contour detection process shown in FIG. 15 or FIG. 18. In a contour detection procedure of Step S8 (FIG. 29) comprising the same type of contour detection as, for example, the embodiment shown in FIG. 15, contour tracking is started by using, as the starting point, the boundary point(s) detected in the boundary points detection process of Steps S1 to S6. When a plurality of contour point candidates have been detected as a choice of boundary points at which tracking may start, a starting point is set by sequentially adopting the individual candidates in the order of their indexes $ID_0$, $ID_1$, $ID_2$, etc., that have been assigned in the order of the magnitude of difference, and a plurality of series of object-contour detecting operations are sequentially performed by employing the individual starting points. In each object-contour detecting operation, a detection range is set around the relevant starting point, and a boundary points detection process similar to Steps S1 to S6 shown in FIG. 29 is performed to detect a plurality of contour point candidates which can indicate a plurality of boundary points at a subsequent boundary position. Since the first of the plurality of series of object-contour detecting operations employs the candidate having the peak-difference index $ID_0$, in each operation of the first series, one of the previously-detected contour point candidates which has a peak difference is connected with one of the newly-detected contour point candidates which has a peak value, thereby detecting a contour portion. Such an operation is repeatedly performed until the starting point is again reached. When the starting point of the first series has been again reached, Step S9 is executed to check whether or not all the indexed candidates have been processed. If the answer to this question is negative, Step S11 is executed, in which one of the indexed candidates having the next index is adopted. Then, Step S8 is again executed to perform contour-detection by employing the newly adopted candidate as the starting point to detect contour point candidates having the same index as the starting point. In the second series of object-contour detecting operations, since a plurality of contour point candidates have already been detected in the first series of object-contour detecting operations, those contour point candidates having the same index as the relevant starting point are connected with each other. When a contour detecting operation employing an indexed candidate with a certain index is not able to detect a contour point candidate having the same index, one of the already detected contour point candidates having an upper order index may be used to continue contour detection.

The contour detection in Steps S8 and S9 adapted to sequentially employing a plurality of indexed candidates and to detect a plurality of series of contour point candidates results in the detection of a contour, such as a contour 302 shown in FIG. 30B, which contains a plurality of lines partially merged with each other.

Figure 33A:
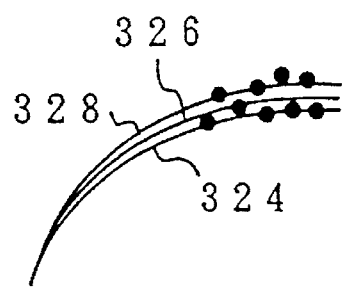
FIGS. 33A and 33B are respectively a view of a boundary comprising a plurality of lines, and an enlarged view of the boundary showing boundary pixels.
Figure 33B:
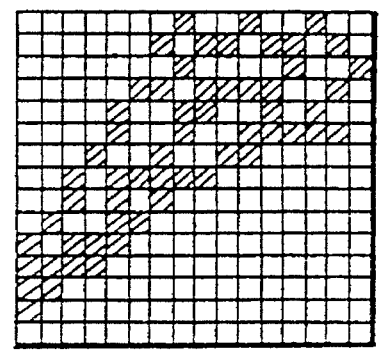

FIG. 33A shows a part of the results of detection shown in FIG. 30B, that is, the detection of a contour containing a plurality of lines. In the illustrated example, three lines 324, 326 and 328 are detected as components of a contour. In FIG. 33B, the three lines are enlarged and depicted as a collection of pixels, the black pixels representing pixels detected as contour point candidates. However, such detection results, in which contour lines are detected on the basis of a plurality of series of contour point candidates, cannot include all the pixels in a boundary area where an object color changes into a background color. As a result, pixels which have not been detected as contour point candidates form gaps. This is because the boundary has various degrees of distinctness between various positions on the periphery of the object, causing variations in the number of contour point candidates detected. In order to cope with this problem, in Step S11 shown in FIG. 29, when a plurality of contour lines have been detected on the basis of contour detection employing all the indexed candidates, the pixels detected as contour point candidates are checked in the vertical and horizontal directions. When there is a pixel which is between two detected contour pixels and which has not been detected as a contour point candidate, that pixel is forcibly set as a contour pixel. With this arrangement, even when a contour detected as a collection of a plurality of lines contains gaps therein, it is possible to determine all the pixel within the boundary area to be contour pixels, and thus, to obtain a gap-free contour area.

FIG. 34 is a flowchart showing another embodiment for detecting a contour area having certain width. This embodiment is characterized in that a plurality of contour point candidates are detected on the basis of the results of calculation of color mixing ratios in a boundary region in which an object color changes into a background color. A boundary detection process in Steps S1 to S7 shown in FIG. 34 is basically the same as the second embodiment of boundary detection shown in FIG. 12. The process shown FIG. 34 is distinguished in that those pixels within a detection range having color mixing ratios close to a plurality of set values are detected as contour point candidates in Step S7.

Figure 35:
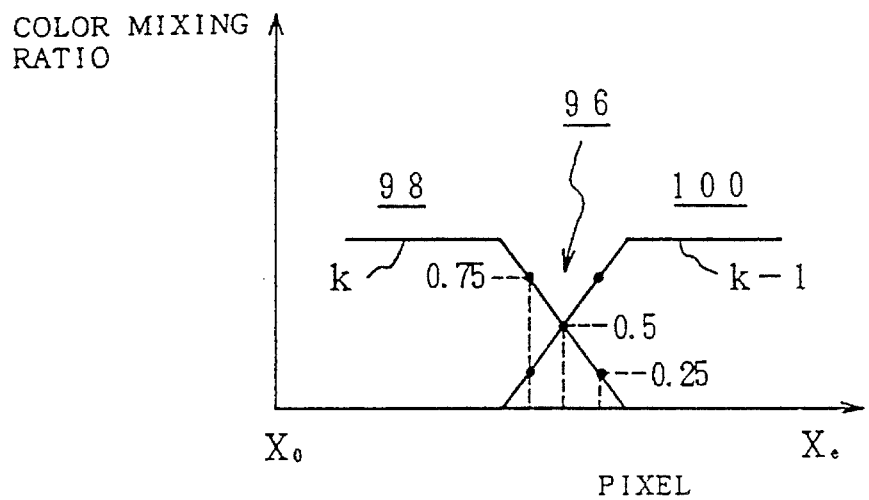
FIG. 35 is a graph for explaining the setting of a threshold value of a color mixing ratio for detecting a plurality of candidates.

As shown in FIG. 35, in a boundary region 96 in which an object color 98 changes into a background color 100, the color mixing ratio k of the object color 98 changes from k=1 to k=0 as the pixel position shifts from the object region to the background region. On the other hand, the color mixing ratio (k−1) of the background color 100 changes from (k−1)=0 to (k−1)=1 as the pixel position shifts as above. On the basis of this fact, three set values of the object color mixing ratio k, such as 0.75, 0.5 and 0.25 are set, as shown in FIG. 35, so that pixel having color mixing ratios close to the three set values can be detected as contour point candidates. The number of such thresholds for determining contour point candidates may, of course, be any number so long as it is appropriate to the number of contour point candidates to be detected. A contour area detection process performed in Steps S9 to S11 is similar to that shown in FIG. 29.

In Step S7 shown in FIG. 34, as described above with reference to FIG. 35, the set values (such as 0.75, 0.5 and 0.25) are directly calculated with respect to, for example, the color mixing ration k of the object color 98, and are used to detect contour point candidates. However, a plurality of set values for detecting contour point candidates may be calculated with respect to the difference $\Delta K$ between the color mixing ratio k of the object color 98 and the color mixing ratio (k−1) of the background color 100, the calculated set values being used to detect, as contour point candidates, those pixels having color mixing ratio differences close to the set values. With the second type of set values, the ratio difference $\Delta K$ between k=0.5 and (k−1)=0.5 equals zero. The ratio difference $\Delta K$ has values from 0 to 1 at positions close to a region of the object color 98, whereas the radio difference $\Delta K$ has values from 1 to 0 at positions close to a region of the the background color 100. Thus, the ratio difference $\Delta K$ itself changes in the same manner as the color mixing ratio k of the object color 98.

Figure 36:
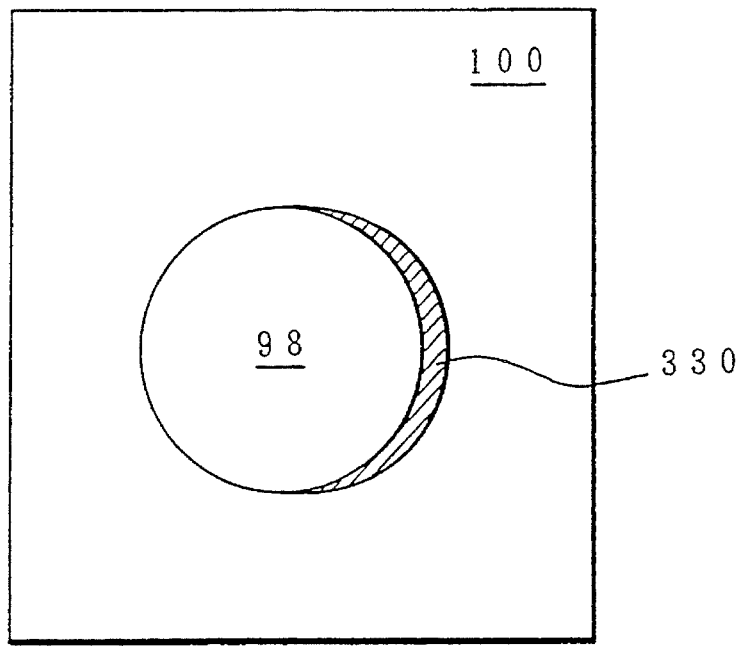
FIG. 36 is a view for explaining an image requiring an object-contour to be detected as an area, as well as color adjustment and image composition utilizing the results of detection of an object-contour area.

FIG. 36 shows an image whose object-contour may be detected advantageously as a contour area by the object-contour detection shown in FIG. 29 or FIG. 34. The image includes a shadow region 330 on the right side (as viewed in FIG. 36) of a region of an object color 98, and an image portion on the outside of the shadow region 330 has a background color 100. If the shadow region 330 is detected as a one-line contour, the detection will result in a zigzag contour line, such as that shown in FIG. 30A, which lies in the shadow region 330, thus, failing to assure correct extraction of the object. In contrast, if contour detection shown in FIG. 29 or 34 is effected, it is possible to detect the shadow region 330 as a contour area having width. When detecting the shadow region 330 as a contour area, color mixing ratios which indicate changes in color from the object color 98 to the background color 100 in a plurality of directions including a vertical direction and a horizontal direction, may be calculated. The calculation of such color mixing ratios is advantageous in that, in a subsequent processing of changing the color object color 98 or the background color 100, or composing the object color 98 region with another background color 100 region, changes in color in the boundary region in the original image can be reproduced through calculations using the color mixing rations, thereby enabling color adjustment or image composition to provide natural appearance of the resultant image. Color adjustment and image composition, which may be performed after the extraction of the object from the image, will be described later.

Thus, when an object color changes into a background color in a relatively wide range, detection of the range as a contour area having certain width (thickness) makes it possible to detect a contour, such as that shown in FIG. 30C, which partially has width. The thus detected contour is not zigzag, in contrast to the contour 300 shown in FIG. 30A, and thus, highly precise contour detection is effected, which assures highly precise object extraction. When a contour area with width has been detected, if color mixing ratios of a plurality of pixels within the contour area, at which ratios the object color changes into the background color, are calculated, the use of the color mixing ratio in a color adjustment or image composition processing makes it possible to realize as smooth color changes as those of the original image in a boundary portion having certain width.

9. Object Extraction

Figure 37:
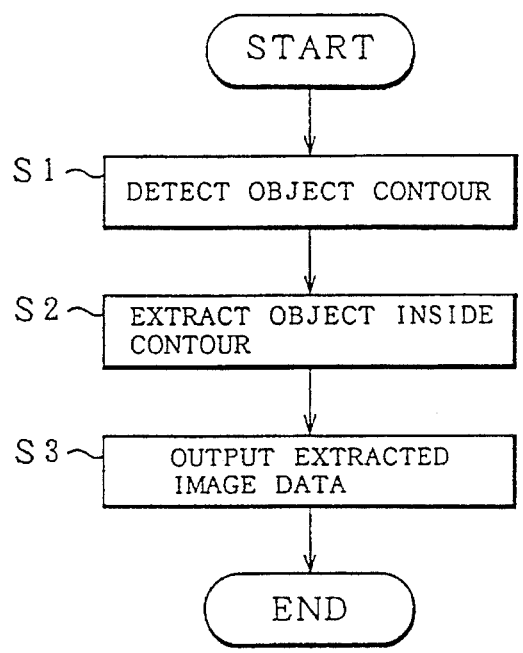
FIG. 37 is a flowchart showing the manner in which an object is extracted according to the present invention.

FIG. 37 is a flowchart showing basic processes of object extraction according to the present invention, in which an object-contour is detected, and then, the object is extracted. In object extraction, the contour of a desired object in the relevant image is detected first in Step S1 by any of the object-contour detection processes described above. Subsequently, in Step S2, the object proper within the object-contour is extracted from the image. In object extraction, when the detected object-contour is displayed on the display, the inside of the object-contour is designated either by the operator or by automatic detection of the relevant inside. Then, on the basis of the results of either the operator's or automatic designation of the inside of the object-contour, the coordinate positions inside the object-contour are specified. Finally, in Step S3, the coordinate positions inside the object-contour which have been specified in Step S2 are output as extracted image data to an external section, thereby obtaining the results of object extraction.

10. First Embodiment of Object Extraction Process

Figure 38:
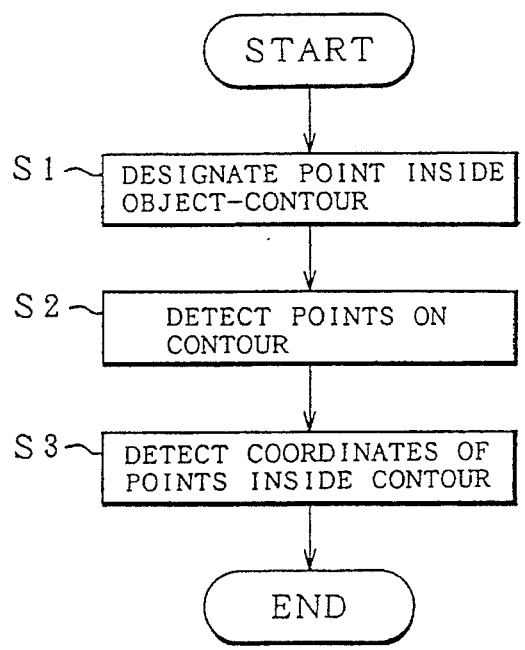
FIG. 38 is a flowchart showing a first embodiment of an object extraction process of the object extraction shown in FIG. 37.

FIG. 38 is a flowchart showing in detail a first embodiment of the object-contour inside extraction process for extracting the object enclosed by the object-contour, which embodiment may be performed in Step S2 shown in FIG. 37. In Step S1 shown in FIG. 38, when an image which has an object whose contour has been detected, is displayed on the monitor screen, the operator designates a point inside the object-contour. In Step S2, points on the object-contour are detected by utilizing the point inside the object-contour designated by the operator. In Step S3, the coordinates of all the points inside the object-contour are detected.

Figure 39:
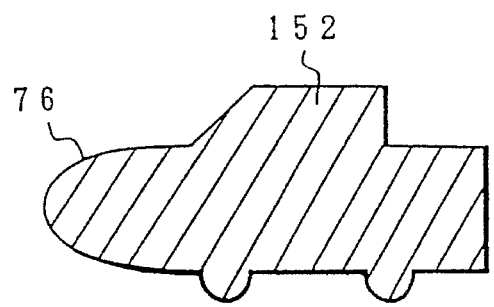
FIG. 39 is a view for explaining filling of the inside of an object-contour for object extraction.

FIG. 39 shows the detection of coordinates inside the object-contour performed in Step S3 shown in FIG. 38. To detect the coordinates inside an object-contour 76 is to uniformly apply particular image data to the pixels within the object-contour 76, thereby uniformly filling the inside of the object-contour with the particular image data. Another particular image data with a value different from the value of the above image data for filling, is uniformly applied to the background. The image data for filling may comprise image data calculated from the image data of the object in its unextracted state, or image data having a known value different from that of the image data of the background.

Figure 40A:
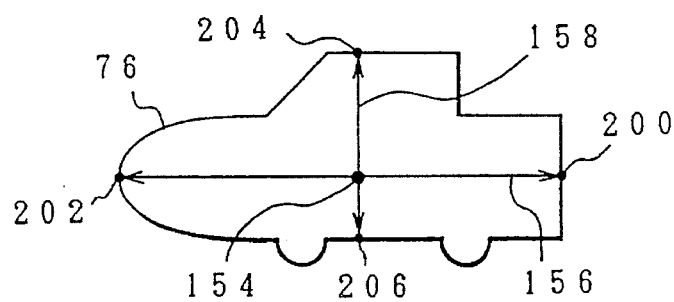
FIGS. 40A, 40B and 40C are views for explaining a manner of filling the inside of an object-contour.
Figure 40B:
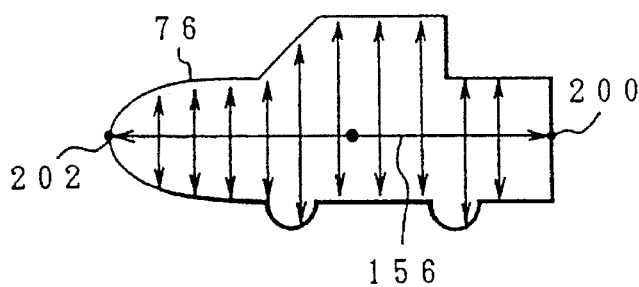
Figure 40C:
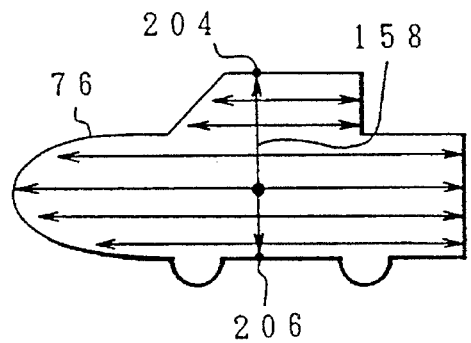

FIGS. 40A, 40B and 40C show a manner of filling the inside of the object contour. First, as shown in FIG. 40A, when the object-contour 76 is displayed as an image on the monitor screen, the operator designates a point 154 inside the object-contour 76 with a mouse or the like. On the basis of the designation of the point 154, detection is performed in X-axis direction (left-right directions, as viewed in FIG. 40A) passing through the designated point 154 until the object-contour 76 is reached, thereby detecting the coordinates of a pair of pixels 200 and 202 on the object-contour 76. Further, detection is performed in Y-axis direction (up-down directions, as viewed in the drawing) passing through the designated point 154 until the object-contour 76 is reached, thereby detecting the coordinates of another pair of pixels 204 and 206 on the object-contour 76.

Subsequently, as shown in FIG. 40B, vertical filling is performed. Specifically, the individual image data of all the pixels between the detected points 200 and 202 on the X-axis are replaced by the value of image data for filling until the object-contour 76 is reached, as indicated by arrows in FIG. 40B. Then, as shown in FIG. 40C, horizontal filling is performed by similarly replacing the individual image data of all the pixels between the detected points 204 and 206 on the Y-axis until the object-contour 76 is reached, as indicated by arrows in FIG. 40C. Thus, when the image data of all the pixels within the object-contour 76 have been replaced, and the object-contour inside has thus been filled, all the pixels representing the object, inclusive of those on the object-contour 76, have image data of a value distinguishable from that of image data of the background. As a result of the filling, therefore, the object can be extracted.

Figure 41:
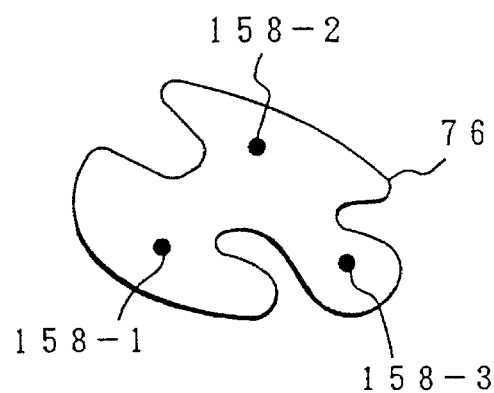
FIG. 41 is a view for explaining a manner of filling the inside of a complicated object-contour.

FIG. 41 shows another manner of filing which is applicable when the object-contour has a complicated shape. When an object-contour 76 has a complicated shape, as shown in FIG. 41, it is not possible to fill the entire region inside the object-contour 76 with the filling manner shown in FIGS. 40A to 40C. In the case shown in FIG. 41, a first point 185-1, such as that illustrated, is designated, and a part of the object-contour inside is filled. Then, a second point 158-2, such as that illustrated, which is within an unfilled part of the object-contour inside is designated, and another part of the object-contour inside is filled. Similarly, a third point 158-3 is designated, and further filling is performed. In this way, it is possible to fill the entire region within the object-contour 76 even when the object-contour 76 has a complicated shape. This manner of filling the entire object-contour inside by subsequently designating a plurality of points requires an increased number of times of operations by the operator when compared with the manner of filling shown in FIGS. 40A to 40C that involves one-point designation. However, in FIG. 41, the filling algorithm itself is simple, and it is possible to curtail the total time required for the filling procedure.

11. Second Embodiment of Object Extraction

Figure 42:
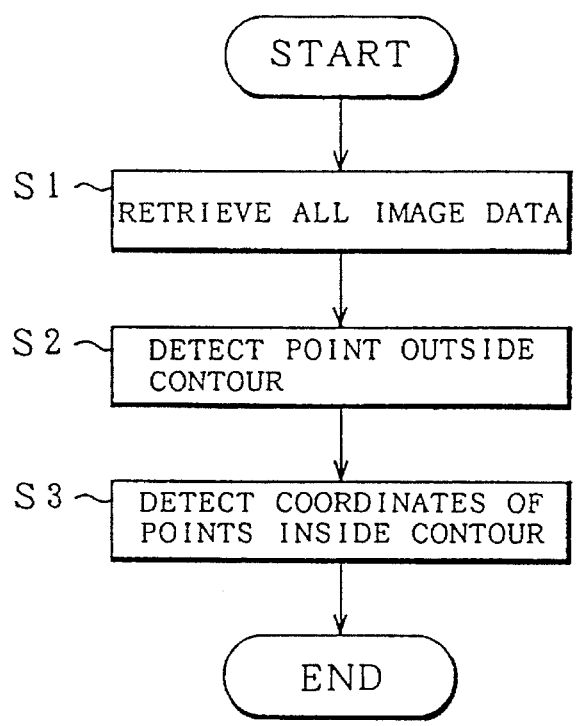
FIG. 42 is a flowchart showing a second embodiment of an object extraction process of the object extraction shown in FIG. 37.

FIG. 42 shows in detail a second embodiment of object-contour inside extraction process which may be performed in Step S2 shown in FIG. 37. The second embodiment is characterized in that a point outside the object-contour is detected, and, on the basis of the detected point outside the object-contour, the coordinates of points inside the object-contour are detected. Specifically, in Step S1, the whole of image data with the detected object-contour is retrieved and displayed on the monitor screen. In Step S2, a point on the outside of the object-contour is detected. Then, in Step S3, on the basis of the detected point on the outside of the object-contour, the coordinates of the points inside the object-contour are detected.

FIGS. 43A and 43B show a manner of filling the outside of the object-contour 76 and detecting the object-contour inside on the basis of the filled object-contour outside, the manner being applicable to the object extraction shown in FIG. 42. First, as shown in FIG. 43A, detection is performed from left and right (as viewed in FIG. 43A) edge portions, or such peripheral portions, of the image in an X-axis direction (left-right direction) until the object-contour 76 is abutted, and all the pixels within a region from the edge portions to positions abutting the object-contour 76 are subjected to data replacement to regard the pixels as those on the outside of the object-contour. Then, as shown in FIG. 43B, detection is performed from upper and lower (as viewed in FIG. 43B) edge portions of the image in an Y-axis direction until the object-contour 76 is abutted, and those pixels within a range from the edge portions to positions abutting the object-contour 76 are subjected to data replacement to regard the pixels as those on the object-contour outside. When filling that portion of the entire image on the outside of the object-contour has been completed, the unfilled portion 160 is regarded as the inside of the object-contour, that is, the object proper, and object extraction is performed.

12. Third Embodiment of Object Extraction with Deletion Mode

Figure 44:
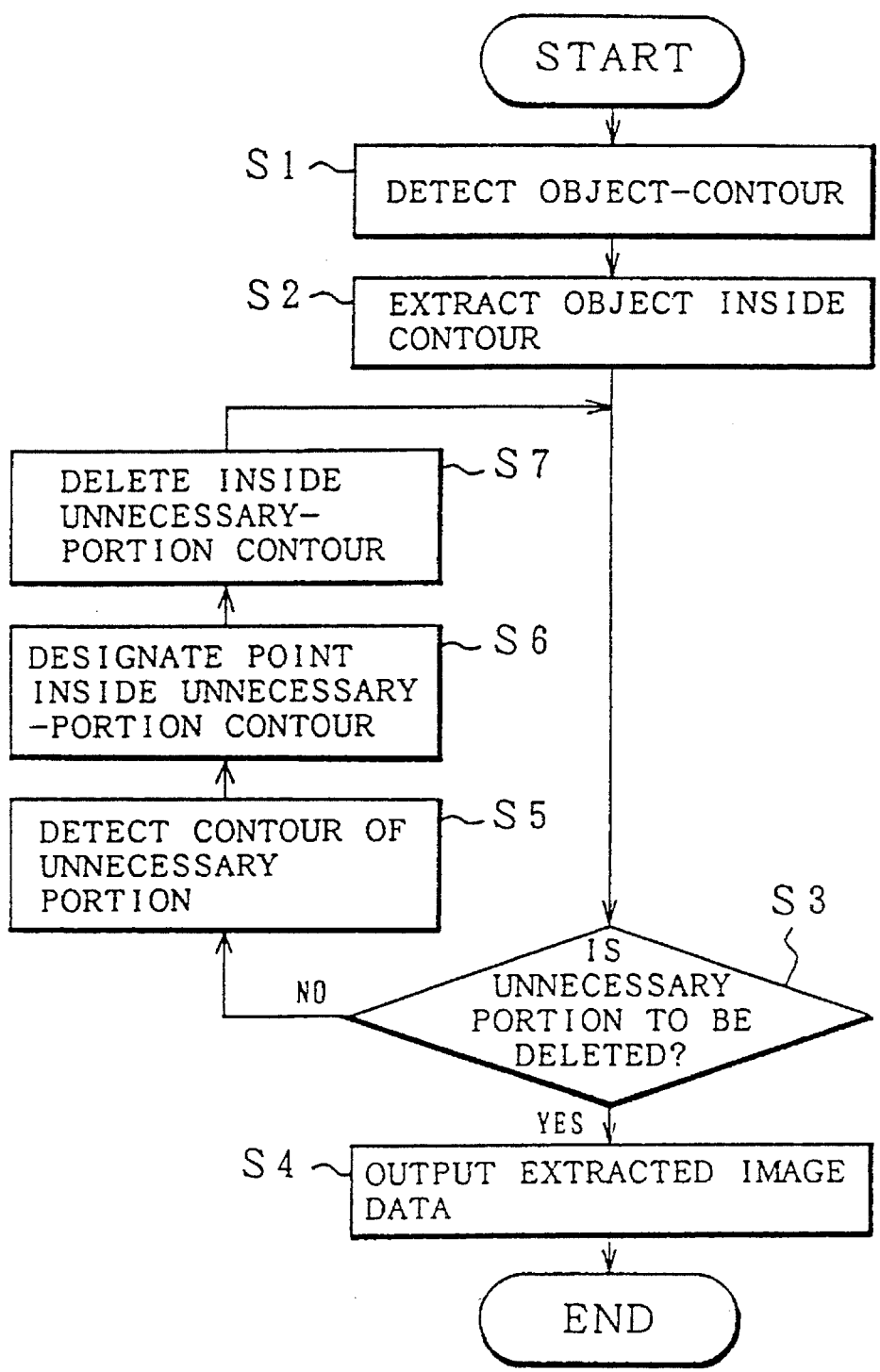
FIG. 44 is a flowchart showing a third embodiment of an object extraction process of the object extraction shown in FIG. 37, the third embodiment including a deleting mode.

FIG. 44 is a flowchart showing a third embodiment of object extraction having a deletion mode, the third embodiment being characterized in that, when the extracted object contains an unnecessary portion, the contour of the unnecessary portion is detected, and the inside of the unnecessary-portion contour is deleted. In Step S1 shown in FIG. 44, the contour of a desired object is detected, and, in Step S2, the object enclosed by the object-contour is extracted from the relevant image by the object-contour inside extraction process shown in FIG. 38 or 42. Then, in Step S3, a determination is made whether or not it is necessary to delete an unnecessary portion from the results of the object extraction. If such deletion is not necessary, extracted image data is output in Step S4. However, if deletion is necessary, Step S5 to S7 are performed. In Step S5, the contour of an unnecessary portion is detected. In Step S6, designation is made on the inside of the unnecessary-portion contour. In Step S7, the inside of the unnecessary-portion contour is deleted.

Figure 45:
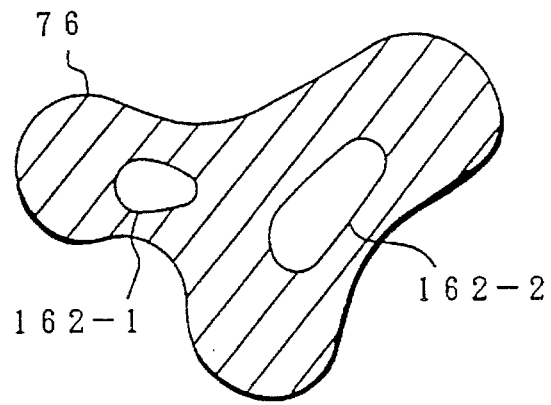
FIG. 45 is a view for explaining deletion performed for an object having hole portions.

A certain type of an object extracted from an image by object extraction according to the present invention may contain unnecessary portion therein, that is, a portion of the image which not the desired object. For example, as shown in FIG. 45, the extracted object may contain holes 162-1 and 162-2 representing holes through which portion of the background are viewed. When a vehicle in an image has been extracted by object extraction to change the color of the body, portions of the extracted vehicle image which represent lights, windows, tires, etc. are unnecessary. In order to cope with such cases, object extraction according to the present invention may include a mode for deleting an unnecessary portion from the extracted object. For example, in order to delete the unnecessary holes 162-1 and 162-2 shown in FIG. 46, object-contour detection described above is applied in such a manner as to detect the respective contours 76-1 and 76-2 of the holes 162-1 and 162-2, and the inside of the detected unnecessary-portion contours 76-1 and 76-2 is filled in the same manner as that shown in FIG. 39 with the image data of the background, thereby deleting data of the unnecessary portion in the extracted object.

Figure 46A:
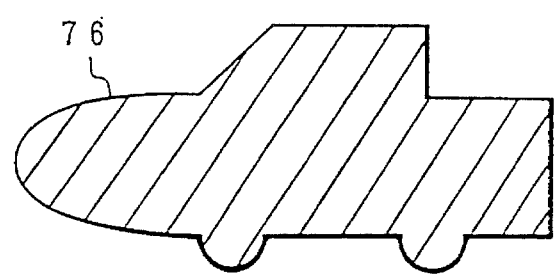
FIGS. 46A and 46B are views for explaining deletion performed when extracting a vehicle body as a desired object.
Figure 46B:
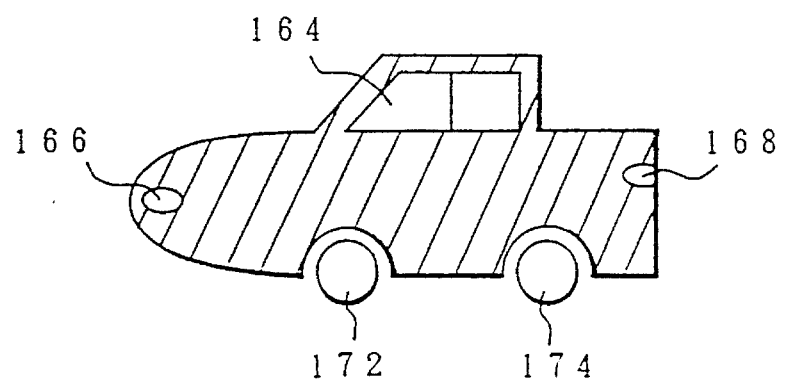

FIGS. 46A and 46B show deletion in object extraction performed to change the color of the body of the extracted vehicle image. When the object extraction provides the results shown FIG. 46A, object-contour detection described above is applied to detect the regions of unnecessary portions, such as a window 164, lights 166 and 168, and tires 172 and 174, and the inside of the unnecessary-portion contours is filled with image data of the background, thereby deleting the unnecessary portions. As a result, image data, shown in FIG. 46B, is obtained, in which the above unnecessary portions are deleted.

13. Output Data Form

Figure 47:
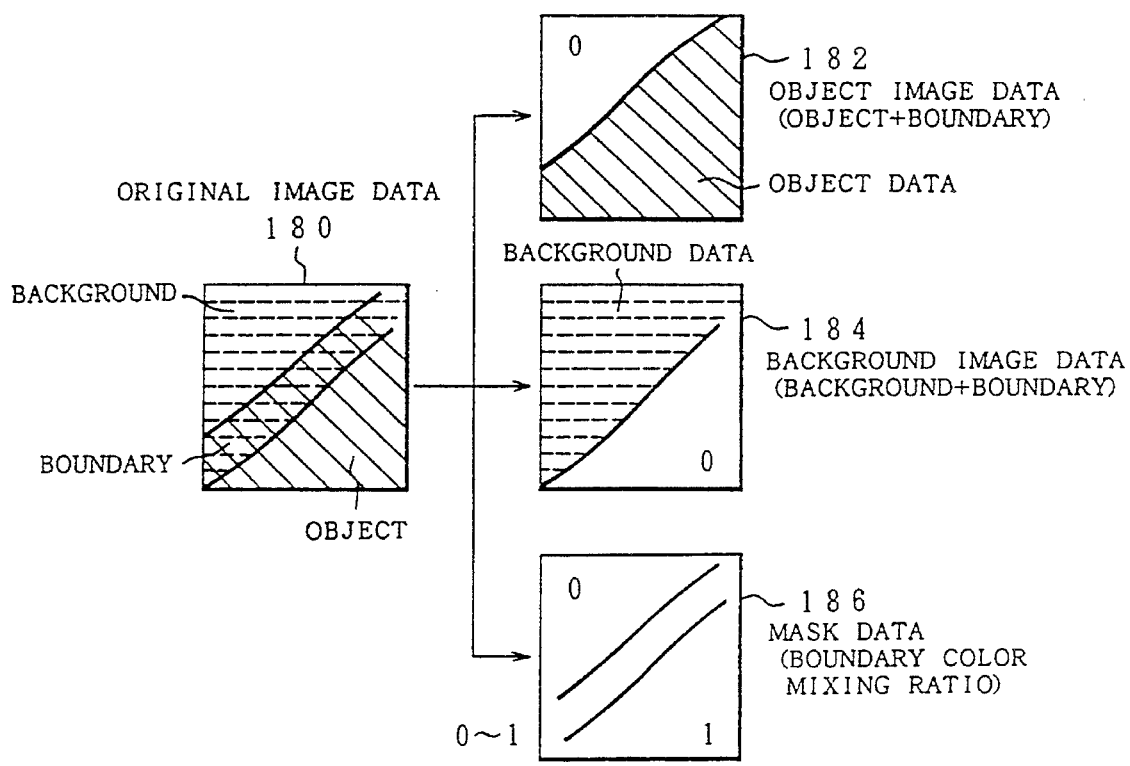
FIG. 47 is a view for explaining various forms of data in which the results of object extraction may be output.

FIG. 47 shows data forms in which the results of object extraction according to the present invention may be output. Referring to FIG. 47, an original image 180 includes data on a desired object and the data on the boundary thereof. When the object has been extracted, the object extraction basically provides an object image data 182 comprising items of data indicating the object and items of data indicating the boundary. Further, it is possible to obtain a background data 184 as the inversion of the object image data 182, the background data 184 comprising items of data indicating the background and items of data indicating the boundary. Still further, it is possible to calculate the color mixing ratio in the boundary region between the object and the background in the original image 180, and to obtain mask data 186 indicating the color mixing ratio in the boundary region, the ratio changing within the range between 0 and 1 in the boundary region when the color mixing ratio of the object is 1 and that of the background is 0. The object image data 182 indicating the object and the boundary includes a boundary portion filled with the color of the object. The background image data 184 indicating the background and the boundary includes a boundary portion filled with the color of the background. The mask data 186 indicating changes in the color mixing ratio in the boundary is used in a subsequent processing, such as a processing of composing the extracted object with another image or a processing of changing the color of the extracted portion and then returning the portion to the original image, to determine changes of color in a boundary portion by using the values of the color mixing ratio in the boundary which are indicated by the mask data 186. For example, in a processing of composing the extracted object with another image, a background color is determined in such a manner that the new background color preserves the same boundary color mixing ratio as that established between the original object and background colors. This enables the composed image to have natural appearance. Since, in a normal image, a background color changes into an object color across two to three pixels of a boundary region, mask data is arranged to indicate the values of the color mixing ratio in a boundary region including contour pixels detected by object-contour detection, described above, and pixels on the periphery of (i.e., on the upper, lower, left and right sides of) the contour pixels. In order to calculate the values of the color mixing ratio, as has been described with reference to FIGS. 7 to 9, object colors at pixels 88 near a boundary pixel 84 and on the side close to the object as well as background colors at pixels 86 near the boundary pixel 84 and on the side close to the background are calculated, and the values of color mixing ratio k are calculated from the equation (1) described with reference to FIG. 13, a model of color mixing between an object color and a background color.

14. Color Adjustment and Image Composition

Figure 48:
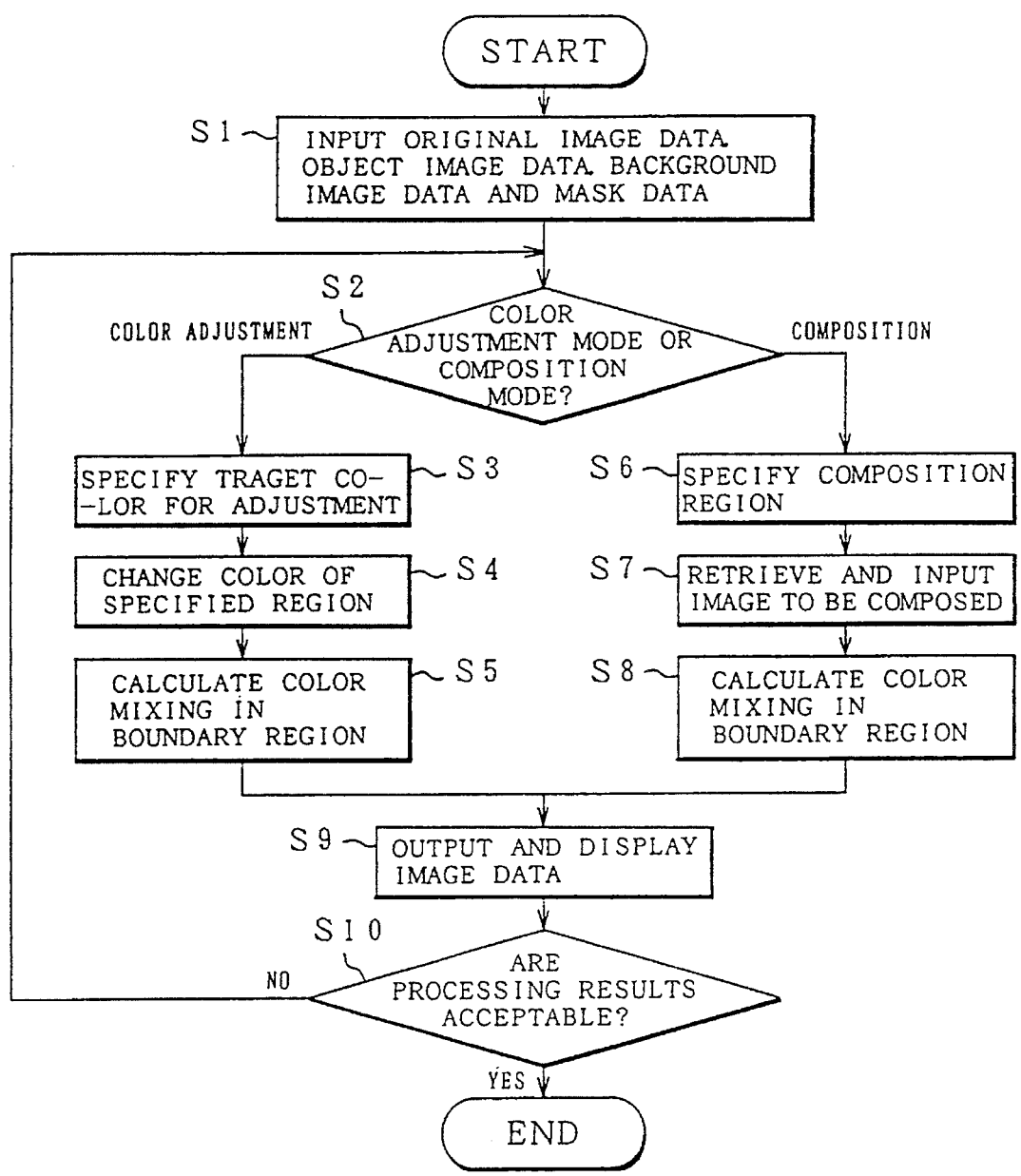
FIG. 48 is a flowchart showing a color adjustment process and an image composition process according to the present invention.

FIG. 48 is a flowchart showing color adjustment and image composition according to the present invention performed on the basis of data output in the forms shown in FIG. 47. Color adjustment and image composition are processings performed in the image processor 14 shown in FIG. 2. Alternatively, the processings may be performed by functions provided in the image processing computer 10.

Referring to FIG. 48, first, in Step S1, data obtained from extracting a desired image from an original image are input. Data input in this step comprise original image data 180, object image data 182, background image data 184 and mask data 186 indicating the boundary color mixing ratio, all shown in FIG. 47. Then, in Step S2, a determination is made whether color adjustment mode or image composition mode is effected. If the operator has set color adjustment mode, a color adjustment processing is performed in Steps S3 to S5. In this processing, in Step S3, a target color to which either an object color or a background color is to be changed, is specified as a target color for adjustment. In Step S4, the color of a specified region is changed to the target color. Subsequently, in Step S5, the color of a boundary region between the portion where the color has been changed and the portion where the color has not been changed is obtained by calculating color mixing of the new combination of colors in the boundary region on the basis of the color mixing ratio in the boundary region of the original image indicated by the input mask data 186. When the color adjustment processing has been completed, Step S10 is executed. In Step S10, the resultant image data is output to and displayed on the color display, and the operator judges whether the results of the processing are acceptable or not. If the results are acceptable, the execution of the processing is terminated. If the results are not acceptable, Step S2 is again executed to again perform color adjustment.

Figure 49:
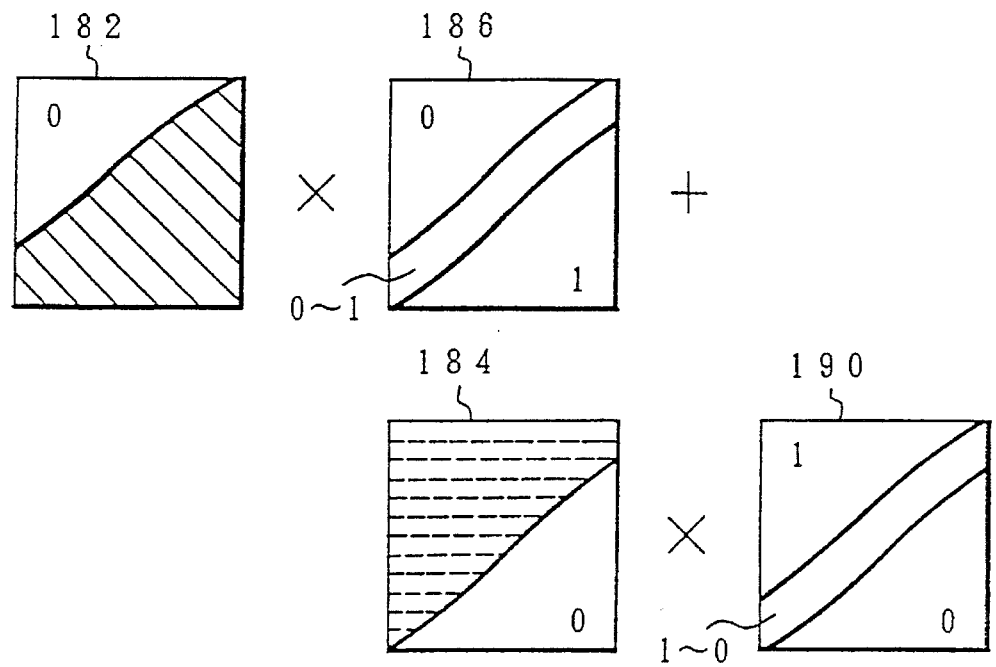
FIG. 49 is a view for explaining color adjustment employing object image data, mask data and background image data.
Figure 50:
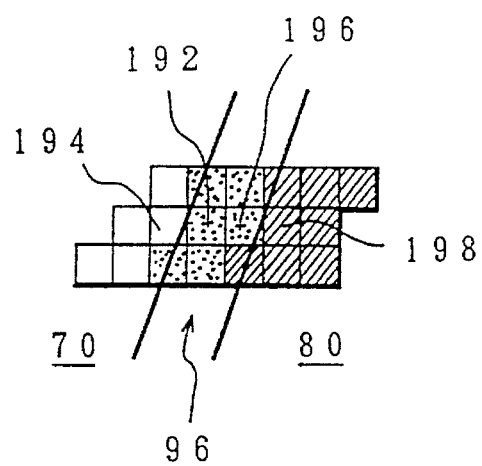
FIG. 50 is a view for explaining a manner of specifying an object color and a background color for use in color mixing calculation employing mask data.

FIG. 49 schematically shows an example of the color mixing calculation for the boundary region performed in Step S5 shown in FIG. 48. The object image data 182, which has resulted from object extraction from the original image, includes color data (hatched in FIG. 49) on the object region, and includes no data (indicated by "0" in FIG. 49) for specifying the color of the background region. The object image data 182 is multiplied by the mask data 186, which has also resulted from object extraction from the original image. On the other hand, background color data 188 is color data which indicates a target color for color adjustment, and which is the result of target color specification. The background color data 188 is multiplied by inverted mask data 190 having values obtained by inverting the input mask data 186. The results of the multiplications are combined together, thereby realizing color adjustment featuring color changes in the boundary region which are in accordance with the color mixing ratio indicated by the mask data extracted from the original image. The above color mixing calculation can be expressed by the following mathematical formula:

$$C_0 = (k \times C_1) + \{(k-1) \times C_2)\}$$

where $C_1$ represents the object color indicated by the object image data 182; k represents the color mixing ratio which is indicated by the mask data 186 and which changes in the boundary region of the original image from 1 assumed at a position close to the object region to 0 assumed at a position close to the background region; $C_2$ represents the background color of the background color data 188 for color adjustment; (k−1) represents the color mixing ratio which is indicated by the inverted mask data 190 and which changes in the boundary region of the original image from 1 assumed at a position close to the background region to 0 assumed at a position close to the object region; and $C_0$ represents the color of the boundary region of the color-adjusted image FIG. 50 shows a manner in which the background color and the object color to be respectively multiplied, in the color mixing calculation shown in FIG. 49, by the color mixing ratio k indicated by the mask data 186 and by the color mixing ratio (k−1) indicated by the inverted mask data 190 may be specified. In the case of, for example, a central horizontal row of pixels among three subsequent rows of pixels, data on the color of a pixel 194 in a background region 70 and adjacent to a boundary region 96 is obtained as data to serve as the background color $C_2$, and data on the color of another pixel 198 in an object region 80 and adjacent to the boundary region 96 is obtained as data to serve as the object color $C_1$. The color mixing calculation shown in FIG. 49 is performed by using the thus obtained object color $C_1$ and the background color $C_2$ of the object pixel 198 and the background pixel 194, respectively, to obtain data on the colors of boundary pixels 192 and 196 in the boundary region 96.

Figure 51:
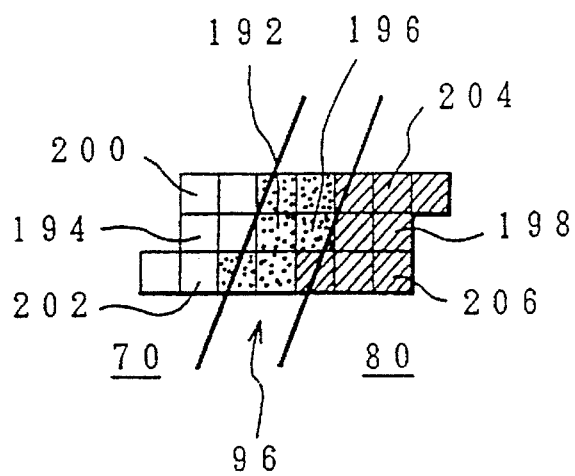
FIG. 51 is a view for explaining another manner of specifying an object color and a background color for use in color mixing calculation employing mask data.

FIG. 51 shows another manner of specifying the object color and the background color to be used in the mixing ratio calculation. In the example shown in FIG. 51, in the case of, for example, a central horizontal row of pixels similar to above, data to serve as the background color $C_2$ is obtained as a mean of three pieces of color data on a background pixel 194 one pixel distant from the boundary pixel 192 in the boundary region and those pixels 200 and 202 at positions above and below the background pixel 194. Similarly, on the side of the object 80, data to serve as the object color $C_1$ is obtained as a mean of three pieces of color data on an object pixel 198 one pixel distant from the boundary pixel 196 and those pixels 204 and 206 positioned above and below the object pixel 198. Then, the color mixing calculation shown in FIG. 49 is performed by using the object color $C_1$ and the background color $C_2$, each obtained as a mean, to obtain data on the colors of boundary pixels 192 and 196 in the boundary region 96. The possible manners of specifying the object color and the background color to be used in color mixing calculation is not limited to those shown in FIGS. 50 and 51. For example, the object color and the background color may alternatively be designated by the operator.

Referring again to FIG. 48, if it is determined, in Step S2, that the operator has set image composition mode, an image composition processing is performed in Steps S6 to S7. In this processing, in Step S6, the region in the original image which is to be composed, such as the background region or the object region, is designated by the operator. In Step S7, an image to be composed is input by retrieving the relevant image. Subsequently, in Step S8, color mixing calculation is performed concerning the boundary region of a composed image, and this is followed by the execution of Step S9, in which the result of the image composition is output to and displayed on the color display, and Step S10, in which the results of the processing is judged by the operator. When the judgment has been given, image composition is again performed, or the execution of the processing is terminated.

Figure 52:
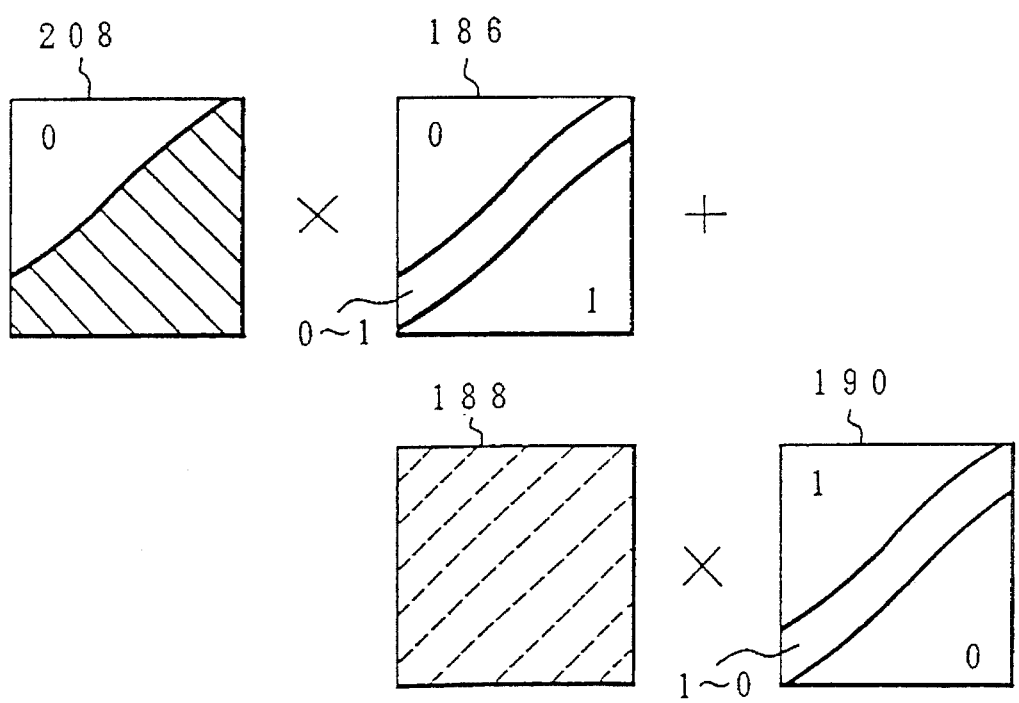
FIG. 52 is a view for explaining image composition employing object image data, mask data and background data.

FIG. 52 shows color mixing calculation on a boundary region performed for the purpose of image composition in Step S8 shown in FIG. 48. Object image data 208 has been obtained by extraction from the relevant original image. Background image data 184 has been retrieved and input on the basis of another image in Step S 7 shown in FIG. 48 for the purpose of composition. In the color mixing calculation, the object image data 208 extracted from the original image is multiplied by mask data 186 which has also been extracted from the original image and which indicates the color mixing ratio in the original-image boundary region. On the other hand, the background image data 184 to be newly combined with the object image is multiplied by inverted mask data 190 having the value obtained by inverting the value of the mask data 186 extracted from the original image. The color mixing calculation per se is similar to that for the color adjustment shown in FIG. 49. Furthermore, the color mixing calculation for the image composition may use an object color $C_1$ of the object image data 208 and a background color $C_2$ of the background image data 184 to be newly combined for the image composition which are determined in the same manner as that shown in FIG. 50 or FIG. 51.

When each of the object color $C_1$ and the background color $C_2$ used in the color mixing calculation shown in FIG. 49 or FIG. 52 comprises, for example, RGB color data, each data comprises three components, shown as follows:

$C_1 = (R_1, G_1, B_1)$ $C_2 = (R_2, G_2, B_2)$

Such color mixing calculation may not necessarily be performed in the RGB space, and may alternatively be performed in another type of color space as needed.

As has been described above, it is possible to automatically perform highly precise extraction of the contour of a particular object and highly precise extraction of the object when the operator has simply designated a position near the contour of the desired object. Thus, the operator has to bear a reduced amount of burden, and the time required for object-contour extraction and object extraction is reduced. Further, since strict designation of the object-contour by the operator is not necessary, the image processing work can be assigned to a relatively wide variety of personnel though the work involves object-contour extraction and object extraction. Still further, the object-contour extraction and object extraction has precision high enough to assure high precision of color-changing and image-composition performed on the basis of the extraction, thereby enabling good image quality to be obtained from the image processing.

Needless to say, an image processing method and object extraction according to the present invention may be carried out either through program-controlling of a computer or by a hardware arrangement adapted for this purpose. The present invention is not intended to be limited by the foregoing embodiments, but intended to include various modifications made therein. Further, the present invention is not intended to be limited by various specific numbers described in the foregoing embodiments.

What is claimed is:

1. A color image processing method for detecting a contour of an object in an image, comprising the steps of:

a contour position designation step wherein a position in a color image near the contour of a desired object contained in said image is designated by a user;

a boundary point detection step wherein a boundary point on said contour of said object is automatically detected on the basis of designation in said contour position designation step;

an object-contour tracking step wherein said contour of said object is detected by subsequently automatically detecting other points on said contour from said boundary point which has been automatically detected in said boundary point detection step; and a termination step wherein contour detection in said object-contour tracking step is checked, and said contour detection is terminated when said contour detection satisfies a prescribed condition.

2. A color image processing method according to claim 1, wherein said contour position designation step comprises a first sub-step wherein said color image is displayed on a display device, and a second sub-step wherein at least one position in said displayed image is designated.

3. A color image processing method according to claim 1, wherein said contour position designation step comprises a first sub-step wherein said color image is displayed on a display device, and a second sub-step wherein a boundary region in said displayed image is designated.

4. A color image processing method according to claim 1, wherein said boundary point detection step comprises:

a first sub-step wherein the coordinates of the position designated in said contour position designation step are detected;

a second sub-step wherein image data of a plurality of pixels near said designated position with said detected coordinates are detected;

a third sub-step wherein differences of said image data from image data at said designated position are calculated for a plurality of directions from said designated position;

a fourth sub-step wherein the maximum of said differences calculated for said plurality of directions is stored;

a fifth sub-step wherein a determination is made as to whether or not such difference calculations have been completed at all the pixels within a previously set detection range including said designated position;

a sixth sub-step wherein, when said difference calculations have not been completed at all said pixels, the coordinates of another pixel within said detection range are detected for a further difference calculation at said another pixel; and a seventh sub-step wherein, when said difference calculations have been completed at all said pixels, the coordinates of a particular one of said pixels within said detection range that has the maximum difference are detected as boundary coordinates.

5. A color image processing method according to claim 1, wherein said boundary point detection step comprises:

a first sub-step wherein the coordinates of the position designated in said contour position designation step are detected;

a second sub-step wherein image data of a plurality of pixels near said designated position with said detected coordinates are detected;

a third sub-step wherein differences of said image data from image data at said designated position are calculated for a plurality of directions from said designated position;

a fourth sub-step wherein a particular one of said directions having the maximum of said calculated differences is detected;

a fifth sub-step wherein said image data of said plurality of pixels near said designated position are expressed by an additive color mixing process, and the color mixing ratios of image data of certain plurality of pixels lying in said particular direction having the maximum difference are calculated and stored;

a sixth sub-step wherein a determination is made as to whether or not such difference calculations have been completed at all the pixels within a previously set detection range including said designated position;

a seventh sub-step wherein, when said difference calculations have not been completed at all said pixels, the coordinates of another pixel within said detection range are detected for a further difference calculation at said another pixel; and an eighth sub-step wherein, when said difference calculations have been completed at all said pixels, the coordinates of a particular one of said pixels within said detection range that has a color mixing ratio closest to a previously set value are detected as boundary coordinates.

6. A color image processing method according to claim 4, wherein said image data used in said difference calculations comprise means each obtained as a mean of image data of a plurality of pixels.

7. A color image processing method according to claim 5, wherein said image data used in said color mixing ratio calculations comprise means each obtained as a mean of image data of a plurality of pixels.

8. A color image processing method according to claim 1, wherein said object-contour tracking step comprises:

a first sub-step wherein the boundary point which has been detected in said boundary point detection step is used as a starting point, and wherein a plurality of peripheral pixels within a first detection range are set around said starting point;

a second sub-step wherein said set peripheral pixels are tracked to detect a subsequent boundary point, and such tracking of peripheral pixels and such detection of a subsequent boundary point are repeatedly effected to track contour portions;

a third sub-step wherein the results of tracking are checked to determine whether or not said starting point has been again reached, and said tracking is terminated when said starting point has been again reached; and a fourth sub-step wherein a determination is made as to whether or not said tracking has been effected either a set number of times or for a set period of time, and said tracking is forcibly terminated even when said starting point has not been again reached by tracking effected either said set number of times or for said set period of time.

9. A color image processing method according to claim 1, wherein said object-contour tracking step comprises:

a first sub-step wherein one of a plurality of boundary points detected in accordance with designation of a plurality of points is used as a starting point to detect coordinates between said starting point and another one of said boundary points;

a second sub-step wherein boundary points are subsequently detected on the basis of such detected coordinates to track contour portions; and a third sub-step wherein the results of tracking are checked to determine whether or not said starting point has been again reached, and said tracking is terminated when said starting point has been again reached.

10. A color image processing method according to claim 1, wherein said object-contour tracking step is adapted to detect boundary points by tracking a designated boundary region.

11. A color image processing method according to claim 1, wherein said object-contour tracking step comprises:

a first sub-step wherein a first point in said object in said image and a second point in a background in said image are designated;

a second sub-step wherein image data on an object color and image data on a background color are detected on the basis of designation of said first and second points, respectively;

a third sub-step wherein a mean of said image data on said object color and said image data on said background color are calculated, said mean comprising image data concerning a plurality of color components;

a fourth sub-step wherein said mean is used as a threshold for dividing the entire image into two regions; and a fifth step wherein a boundary region between said two regions is detected.

12. A color image processing method according to claim 1, wherein said object-contour tracking step comprises:

a first sub-step wherein a first point in said object in said image and a second point on a background in said image are designated;

a second sub-step wherein image data on an object color and image data on a background color are detected on the basis of designation of said first and second points, respectively;

a third sub-step wherein color mixing ratios are calculated by expressing the entire image data by an additive process as color mixture of said object color and said background color;

a fourth sub-step wherein a threshold comprising a certain color mixing ratio is used to divide the entire image into two regions; and a fifth step wherein a boundary region between said two regions is detected.

13. A color image processing method according to claim 1, further comprising a smoothing step wherein the contour of said object which has been detected in said object-contour tracking step is smoothed.

14. A color image processing method according to claim 1, wherein said object-contour tracking step further comprises a sub-step of deleting at least a portion of the detected contour of said object, and again detecting the deleted portion of the contour.

15. A color image processing method according to claim 1, further comprising:

an extraction step wherein said object in said image is extracted from said image on the basis of the results of detection of the contour of said object; and an outputting step wherein extracted image data obtained in said extraction step is output, said method being adapted to extract said object from said image by effecting the above steps.

16. A color image processing method according to claim 15, wherein said extraction step comprises:

a first sub-step wherein a position inside said contour of said object is designated;

a second sub-step wherein the coordinates of points on said contour are detected on the basis of designation inside said contour; and a third sub-step wherein the coordinates of points inside said contour are detected on the basis of detection of said coordinates of said points on said contour.

17. A color image processing method according to claim 15, wherein said extraction step comprises:

a first sub-step wherein coordinates outside said contour of said object are detected by detecting said contour from end portions of said image; and a second sub-step wherein the coordinates of points inside said contour are detected on the basis of detection of said coordinates outside said contour.

18. A color image processing method according to claim 15, wherein said extraction step further comprises:

a fourth sub-step wherein the contour of an inner object inside said contour of said object is detected;

a fifth sub-step wherein a position inside said detected contour of said inner object is designated; and a sixth sub-step wherein the inside of said contour of said inner object is deleted on the basis of designation of said position inside the contour of said inner object.

19. A color image processing method according to claim 15, wherein said outputting step comprises:

a first sub-step wherein the color mixing ratio at which an object color and a background color are mixed with each other at an object-contour portion of said object extracted in said extraction step is calculated; and a second sub-step wherein mask data indicating the results of calculation of the color mixing ratio, object image data indicating an object color and a boundary between said object and the background thereof, and background image data indicating said object color and said boundary, are output.

20. A color image processing method according to claim 1 and 15, wherein:

said boundary point detection step comprises a candidate detection sub-step wherein at least one candidate for a point on said contour of said object is detected at each of a plurality of positions on the periphery of said object; and said object-contour tracking step comprises: a contour portions detection sub-step wherein contour portions constituting at least one continuous line are detected on the basis of the at least one candidate detected in said candidate detection sub-step; and a contour area detection sub-step wherein a contour area having a width varying between various positions of said contour area is detected on the basis of said at least one line detected in said contour portions detection sub-step.

21. A color image processing method according to claim 20, wherein, said candidate detection sub-step is adapted such that a pixel which is at a position on the periphery of said object and which has a greater degree of change in color than a threshold set for a prescribed range, is detected as a candidate.

22. A color image processing method according to claim 20, wherein said contour area detection sub-step is adapted such that pixels which are within a detected region and which are not included in the detected candidates are set as contour pixels.

23. A color image processing method according to claim 1, further comprising:

a color adjustment step wherein the color of either said object or the background thereof which has been extracted from said image in the extraction step is changed, and wherein a color to be applied to a boundary portion between said object and said background after the color-changing is calculated on the basis of the color mixing ratio between the object color and the background color which has been possessed by said image before said color-changing.

24. A color image processing method according to claim 1, further comprising:

an image composition step wherein either said object or the background thereof which has been extracted from said image in the extraction step is composed with either a background or an object extracted from another image, and a color to be applied to a boundary portion between the composed object and the composed background after the image composition is calculated on the basis of the color mixing ratio between an object color and a background color which has been possessed by said image before said image composition.

25. A color image processing method according to claim 23, wherein each of said color adjustment step and said image composition step is adapted to effect color adjustment and image composition, respectively, on the basis of mask data indicating the color mixing ratio at a boundary between a region having said object color and another region having said background color, object image data indicating said object color and said boundary, and background image data indicating said background color and said boundary, all of which data have been output in said outputting step.

26. A color image processing apparatus comprising:

storage means for storing input color image data;

display means for displaying said input color image data;

contour position designation means for receiving input data from a user designating a position near the contour of a desired object in said image;

boundary point detection means for automatically detecting a boundary point on said contour of said object on the basis of designation through said contour position designation means;

object-contour tracking means for subsequently automatically detecting other points on said contour from said boundary point which has been automatically detected by said boundary point detection means so as to detect said contour of said object; and termination means for checking contour detection by said object-contour tracking means, and for terminating said contour detection when said contour detection satisfies a prescribed condition.

27. A color image processing apparatus according to claim 26, further comprising:

extraction means for extracting said object in said image on the basis of object-contour detection by said object-contour tracking means; and outputting means for outputting extracted image data obtained by said extraction means.

28. A color image processing apparatus according to claim 27, wherein said outputting means is adapted to output at least one of object extraction data including an object-contour, background extraction data including said object-contour, and color mixing ratio data indicating the color mixing ratio at a boundary region between said object and the background thereof.

29. A color image processing apparatus according to claim 26, further comprising:

color adjustment means for changing the color of either said object or the background thereof which has been extracted from said image by said extraction means, and for calculating a color to be applied after the color-changing to a boundary portion between said object and the background thereof on the basis of the color mixing ratio between the object color and the background color which has been possessed by said image before the color-changing.

30. A color image processing apparatus according to claim 26, further comprising:

image composition means for composing either said object or the background thereof which has been extracted from said image by said extraction means with either a background or an object extracted from another image, and for calculating a color to be applied after the image composition to a boundary between the composed object and the composed background on the basis of the color mixing ratio between an object color and a background color which has been possessed by said image before the image composition.

* * * * *

UNITED STATES PATENT AND TRADEMARK OFFICE
CERTIFICATE OF CORRECTION

PATENT NO. : 5,475,507

DATED : December 12, 1995

INVENTOR(S) : Shoji SUZUKI, et al.

It is certified that error appears in the above-indentified patent and that said Letters Patent is hereby corrected as shown below:

Title page, item [57], delete "double spaces" and "double line spaces"

Col. 1, line 8, delete "1".

Col. 2, line 2, delete "2".

Col. 13, line 65, delete second occurrence "in".

Col. 28, line 28, change "near" to --neighboring--;

line 32, before "on" insert --based--;

line 32, delete "the basis of designation in" and after "said" insert --position designated in said--.

Col. 31, line 66, delete "and 15".

UNITED STATES PATENT AND TRADEMARK OFFICE
CERTIFICATE OF CORRECTION

PATENT NO. : 5,475,507
DATED : December 12, 1995
INVENTOR(S) : Shoji SUZUKI, et al.

It is certified that error appears in the above-indentified patent and that said Letters Patent is hereby corrected as shown below:

Col. 32, line 66, change "near" to --neighboring--.

Col. 33, line 2, after "object" insert --based--;

line 3, delete "the basis of designation through" and insert -- said position designation by --.

Signed and Sealed this

Fourteenth Day of May, 1996

Attest:

BRUCE LEHMAN

Attesting Officer      Commissioner of Patents and Trademarks